(12) United States Patent
Ziemer et al.

(10) Patent No.: US 8,545,364 B2
(45) Date of Patent: Oct. 1, 2013

(54) GEAR SET ARRANGEMENT OF A PLANETARY TRANSMISSION

(75) Inventors: Peter Ziemer, Tettnang (DE); Hagen Dopfert, Lindau (DE); Jurgen Kemmer, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 7 days.

(21) Appl. No.: 13/375,800

(22) PCT Filed: May 19, 2010

(86) PCT No.: PCT/EP2010/056903
§ 371 (c)(1),
(2), (4) Date: Dec. 2, 2011

(87) PCT Pub. No.: WO2010/139553
PCT Pub. Date: Dec. 9, 2010

(65) Prior Publication Data
US 2012/0088628 A1   Apr. 12, 2012

(30) Foreign Application Priority Data
Jun. 4, 2009   (DE) .......................... 10 2009 026 703

(51) Int. Cl.
*F16H 57/08* (2006.01)
(52) U.S. Cl.
USPC .......................................... 475/331; 475/903
(58) Field of Classification Search
USPC .................................................. 475/331, 903
See application file for complete search history.

(56) References Cited

U.S. PATENT DOCUMENTS

| | | | |
|---|---|---|---|
| 2,503,497 | A | 4/1950 | May |
| 4,615,231 | A | 10/1986 | Takahashi |
| 4,901,602 | A | 2/1990 | Matoba |
| 5,429,557 | A | 7/1995 | Beim |
| 5,456,476 | A | 10/1995 | Premiski et al. |
| 5,910,063 | A | 6/1999 | Kato |
| 5,928,100 | A | 7/1999 | Ohtake et al. |
| 7,097,582 | B2 | 8/2006 | Bauknecht et al. |
| 7,824,302 | B2 | 11/2010 | Diosi et al. |
| 2008/0064556 | A1* | 3/2008 | Kamm et al. ................. 475/276 |
| 2008/0269003 | A1* | 10/2008 | Bauknecht et al. ........... 475/276 |
| 2008/0269004 | A1 | 10/2008 | Diosi et al. |
| 2011/0009229 | A1 | 1/2011 | Bauknecht et al. |

FOREIGN PATENT DOCUMENTS

| | | |
|---|---|---|
| DE | 43 02 844 C1 | 7/1994 |
| DE | 197 36 686 A1 | 3/1998 |
| DE | 102 21 097 A1 | 11/2003 |
| DE | 10 2005 014 592 A1 | 10/2006 |

(Continued)

*Primary Examiner* — Edwin A Young
(74) *Attorney, Agent, or Firm* — Davis & Bujold, PLLC

(57) ABSTRACT

A gear set arrangement for a planetary transmission comprising at least first and second simple planetary gear sets, each having sun and ring gears and a carrier supporting planetary gears. The gear sets are coaxially nested with the first gear set being radially within the sun gear of the second gear set in a common radial plane or radial planes which are only slightly axially offset. The ring gear of the inner first gear set and the sun gear of the outer second gear set, and the carriers of the two gear sets, are coupled in a fixed manner. To avoid forced movement of the gears, only one of the sun gear, the ring gear or the carrier, of each of the first and the second gear sets is radially supported substantially free of radial play on a centrally disposed transmission shaft or with respect to a centered supported component.

20 Claims, 21 Drawing Sheets

(56) References Cited

FOREIGN PATENT DOCUMENTS

| | | |
|---|---|---|
| DE | 10 2007 017 138 A1 | 10/2008 |
| DE | 10 2007 023 952 A1 | 11/2008 |
| DE | 10 2008 000 429 A1 | 9/2009 |
| EP | 0 609 659 A1 | 8/1994 |
| EP | 1 504 205 B1 | 2/2006 |
| EP | 1 832 782 A1 | 9/2007 |
| JP | 2001-32913 A | 2/2001 |
| WO | 2005/120877 A1 | 12/2005 |

* cited by examiner

GEAR SET ARRANGEMENT OF A PLANETARY TRANSMISSION

This application is a National Stage completion of PCT/EP2010/065903 filed May 19, 2010, which claims priority from German patent application serial no. 10 2009 026 703.4 filed Jun. 4, 2009.

FIELD OF THE INVENTION

The invention relates to a gear set arrangement of a planetary transmission, for example an automatic transmission for a motor vehicle, comprising at least two simple planetary gear sets, which each comprise a sun gear, a ring gear and a carrier supporting a plurality of planetary gears, and which are disposed in a coaxial nested arrangement of one of the planetary gear sets radially within the sun gear of the other planetary gear set in a common radial plane, or in radial planes which are slightly offset axially from each other, wherein the ring gear of the radially inner planetary gear set and the sun gear of the radially outer planetary gear set, and the carriers of the two planetary gear sets, are each coupled together in a rotationally fixed manner.

BACKGROUND OF THE INVENTION

Modern automatic transmissions for motor vehicles for implementing a plurality of gear steps typically are comprised of several planetary gear sets, which can be designed as simple planetary gear sets and/or as combined planetary gear sets, for instance Simpson gear sets, or Ravigneaux gear sets. Some of the components of these planetary gear sets, such as the sun gears, ring gears and carriers (planet carriers), are coupled together in a rotationally fixed manner, and others are selectively coupled via assigned friction shift elements, which are preferably designed as multi-disk clutches and multi-disk brakes, that is, for shifting a specific gear step, they can be coupled together to an input shaft, an output shaft or together, or they can be fixed with respect to the transmission housing.

To satisfy the requirement to permanently operate the drive motor to the greatest extent possible in a rotational speed range with low specific fuel consumption, increasing numbers of gear steps are necessary which, however, is inevitably associated with an increased number of the planetary gear sets in an automatic transmission. However, with the customary axially adjacent arrangement of the planetary gear sets, this leads to an increased axial construction length of the automatic transmissions, thereby complicating or even preventing a front transverse mounting of the drive unit which is comprised of the drive motor and the automatic transmission.

As a result, numerous concepts have been proposed for multi-stage automatic transmissions having at least two simple planetary gear sets, where one of these planetary gear sets is disposed coaxially or radially within the sun gear of the other planetary gear set. Here, both planetary gear sets can be disposed in a common radial plane or in radial planes that are slightly offset axially from each other, so that a gear set plane can be eliminated compared to an axially adjacent arrangement, thereby reducing the axial construction length of the respective automatic transmission.

The document U.S. Pat. No. 5,429,557 A discloses a first automatic transmission having a radially nested arrangement of two simple planetary gear sets. The two planetary gear sets are disposed coaxially above the output shaft, and form the main gear set of this disclosed automatic transmission. The ring gear of the radially inner planetary gear set and the sun gear of the radially outer gear set are formed integrally, that is, combined in a common gear component. The carriers of the planetary gear sets are rigidly connected together, and are in drive connection with the output shaft of the transmission.

In a first embodiment of this disclosed automatic transmission, there are six forward gears and one reverse gear that can be shifted using three clutches and two brakes, where an input side drive connection is created to the input shaft which is disposed axis parallel to the output shaft, in each case via a first input step with an underdrive transmission ratio and/or via a second input step with an overdrive transmission ratio. In a second embodiment of this automatic transmission, there are six forward gears and one reverse gear that can be shifted using two clutches and three brakes, where the input side drive connection to the input shaft is created in each case via a single input step with an underdrive transmission ratio, and as required, via a simple planetary gear set on the input side of the main gear set.

The document DE 10 2005 014 592 A1 describes a second automatic transmission with a radially nested arrangement of two simple planetary gear sets in several embodiments. This known automatic transmission comprises four simple planetary gear sets coupled together. Two of these planetary gear sets are disposed in a common radial plane, where the one planetary gear set is disposed radially within the sun gear of the other planetary gear set of the input side gear set. The ring gear of the radially inner planetary gear set and the sun gear of the radially outer gear set are preferably rigidly coupled together by means of a one-piece construction. This known automatic transmission comprises eight forward gears and one reverse gear that can be shifted using three clutches and two brakes.

A further automatic transmission with a radially nested arrangement of two simple planetary gear sets is the subject matter of the undisclosed document DE 10 2008 000 429.4 (published as DE 10 2008 000 429) from the applicant. The automatic transmission described in that document in several embodiments, comprises an input side gear set and a main gear set. Whereas the input side gear set in all embodiments comprises two coupled simple planetary gear sets, the main gear set comprises either two coupled simple planetary gear sets or a Ravigneaux gear set.

In some embodiments, the two planetary gear sets of the input side gear set are disposed in radial planes slightly offset axially from each other, and in other embodiments they are in a common radial plane, where the first planetary gear set is disposed radially within the sun gear of the second planetary gear set. The ring gear of the radially inner planetary gear set and the sun gear of the radially outer planetary gear set are rigidly connected together.

The carriers of the two planetary gear sets are likewise rigidly connected together, and depending on the embodiment, coupled in a rotationally fixed manner to the ring gear of the first planetary gear set of the main gear set, to the sun gear of the first planetary gear set of the main gear set, to the small sun gear of the Ravigneaux gear set or to the large sun gear of the Ravigneaux gear set. In each of the embodiments of the automatic transmission, there are nine forward gears and one reverse gear that can be shifted via three clutches and three brakes, where for avoiding drag moments of disengaged friction shift elements, one clutch and one brake are each designed as dog clutches.

In the described radially nested arrangement of two simple planetary gear sets, the centering of the components is problematic due to the radial expansion of the components, the high rotational speeds occurring to some extent, and the high masses of some component parts. Thus, in the presently considered coaxially nested arrangement, the ratio of the reference circle diameter of the outer ring gear, that is, the ring gear of the radially outer planetary gear set, and of the inner sun gear, that is, the sun gear of the radially inner planetary gear set, is greater than 3.5.

In addition, such an arrangement of two planetary gear sets as an input side gear set of an automatic transmission according to the undisclosed document DE 10 2008 000 429.4 (published as DE 10 2008 000 429), the shifted fourth forward gear for example, results in a superelevation of rotational speed of the coupled carriers of the two planetary gear sets of approximately 1.38, of the outer ring gear of approximately 1.63, and of the inner sun gear of approximately 2.13, relative to the input shaft in drive connection with the drive motor.

Due to the relatively large circumferential expansion of the radially outer components, particularly of the coupled carrier of the two planetary gear sets and of the outer ring gear, these components additionally have inevitably relatively high masses.

For centering a single simple planetary gear set, it is generally known to be sufficient to radially support a single component, for instance the sun gear, a ring gear carrier rigidly connected to the ring gear, or the carrier, For example, on a centrally disposed transmission shaft with minimal radial play; however, with the currently considered radially nested arrangement of two simple planetary gear sets, this is not possible in this configuration due to the named reasons. Thus, production related eccentricities or asymmetries of components, in the case of heavy or fast rotating components, can lead to uneven rotation, increased wear particularly of the gearing and to increased operating noise. Likewise, due to their weight, the heavy components, particularly the coupled carriers and the outer ring gear, can slip radially downward when they are not rotating to the extent that self-centering of these components during the next startup of rotation is only possible with considerable delay.

FIG. 1 from the already named document U.S. Pat. No. 5,429,557 A shows a known mounting arrangement of two radially nested simple planetary gear sets, for example. In the sectional view of the first embodiment of the particular automatic transmission shown there, the sun gear of the radially inner planetary gear set is rigidly connected to an intermediate shaft designed as a hollow shaft, and supported together with it by means of a needle bearing on the centrally disposed output shaft.

The two rigidly connected carriers are supported on the axially opposite side of the two planetary gear sets using a bearing hub of the carrier of the radially inner planetary gear set using at least one needle bearing on the output shaft. The one-piece gear component in which the ring gear of the radially inner planetary gear set and the sun gear of the radially outer planetary gear sets are combined is rigidly connected to the inner disk carrier of an axially adjacent clutch, and supported via this carrier by means of a plain bearing sleeve on a bearing hub of the output gear of the first input stage. The output gear of the first input stage is in turn, supported via two needle bearings on the sun gear of the radially inner planetary gear set and the intermediate shaft connected thereto.

The ring gear of the radially outer planetary gear set is rigidly connected to the output gear of the second input stage, which in turn is supported via two needle bearings in the bearing hub of the carrier of the radially inner planetary gear set.

All components of these two planetary gear sets are forcibly guided with respect to their gearing due to the radial support. In addition, unfavorably long tolerance chains result for some components due to the multiple staggering of the radial supports. Even in the case of only a small eccentricity or ovality of a component in one of the two planetary gear sets, radial warping and uneven running inevitably occur, in conjunction with increased wear of the radial support and gearing, as well as increased operating noise.

SUMMARY OF THE INVENTION

Based on this background, the problem addressed by the present invention is to propose a centering bearing concept for two simple planetary gear sets of the initially named type that are disposed axially and radially nested, with which the stated disadvantages can be avoided with a simple and space-saving construction.

A first solution of the problem according to the invention consists in that only one component of each of the two planetary gear sets, namely the sun gear, the ring gear, or the carrier, is radially supported essentially free of radial play on a centrally disposed transmission shaft or with respect to a centered supported component.

The invention is based on a gear set arrangement of a planetary transmission, for example an automatic transmission for a motor vehicle, comprising at least two simple planetary gear sets, which each comprise a sun gear, a ring gear and a carrier supporting a plurality of planetary gears, and which are disposed in a coaxially nested arrangement of one of the planetary gear sets radially within the sun gear of the other planetary gear set in a common radial plane, or in radial planes which are slightly offset axially from each other. Additionally with this gear set arrangement, the ring gear of the radially inner planetary gear set, referred to in the following as an inner ring gear, and the sun gear of the radially outer planetary gear set, referred to in the following as an outer sun gear, and the carriers of the two planetary gear sets, are each coupled together in a rotationally fixed manner.

According to the invention, with this gear set arrangement of a planetary transmission, only one component of each planetary gear set is radially supported and therefore centered on a centrally disposed transmission shaft, which is typically an input or output shaft of the planetary transmission, or is supported on, or in, a preferably centered supported component on the central transmission shaft, for instance, a component radially supported on the central transmission shaft of one of the two planetary gear sets, or of a further planetary gear set disposed axially adjacent thereto. The remaining two components of each planetary gear set are automatically centering using the respective gearing, without special radial support. Therefore, forced movement of the gears is excluded in both planetary gear sets, thereby avoiding the initially described wear and noise problems.

Because heavy components, for instance the two coupled carriers and the ring gear of the radially outer planetary gear set, referred to as the outer ring gear in the following, are expediently radially supported, or at least should be provided with a radial guidance in order to avoid the initially described problem when not rotating and with the startup of rotation, as well as the rapidly rotating components, for instance the two coupled carriers, the sun gear of the radially inner planetary gear set, referred to as the inner sun gear in the following, and the outer ring gear, a second solution according to the invention for the problem consists in that at least two components, namely the sun gear, the ring gear and/or the carrier of one of the two planetary gear sets are each radially supported on a centrally disposed transmission shaft or with respect to a centered supported component, wherein at least one component (sun gear and/or ring gear and/or carrier) of the other planetary gear set is supported radially on a centrally disposed transmission shaft or radially opposite to a centrally supported component.

This guarantees that the heavy components are either radially supported themselves, or are sufficiently radially guided by the gearing with one or two radially supported components of the same planetary gear set, in order to avoid a deep radial fall in the gearing when not rotating, and to enable an automatic centering at the start of rotation. Likewise, imbalances due to production dependent eccentricities or ovalities of the rapidly rotating components are substantially compensated for, or at least diminished due to this design.

If the emphasis of the radial support of the two planetary gear sets according to the second solution according to the invention is for avoiding forced movement, then according to a further development of the invention, the radial support of the one component in each of the two planetary gear sets is essentially free of radial play, and the radial support of the other components is implemented with radial play.

If however, the emphasis with the second solution according to the invention is avoiding imbalances, then for this purpose at least in one of the two planetary gear sets, preferably in the radially outer planetary gear set due to the high masses, the radial supports of the two components are expediently implemented essentially free of radial play.

In both concepts for centering bearing according to the invention, the inner ring gear and the outer sun gear can be rigidly connected together in a common gear component, and can be coupled to a carrier in a rotationally fixed manner essentially free of radial play; this carrier is radially supported in an assigned bearing hub on the central transmission shaft or on a bearing shaft of a centrally supported component of one of the two planetary gear sets, or an axially adjacent assembly, such as on a bearing shaft of a component of an axially adjacent further planetary gear set, or a disk carrier of a friction shift element that is disposed axially adjacent. Due to the central position of the inner ring gear and the outer sun gear between the two planetary gear sets, in the case of a rigid connection, that is, with a coupling of the two components, that is rotationally fixed and also free of axial and radial play, which is preferably attained by a one-piece construction, both components are space saving and can be centering via a single radial support.

The connection, free of radial play, of the common gear component, that is, the combined sun gear/ring gear, to the carrier can be attained by coupling the common gear component by means of a synchronization gearing, that is essentially free of radial play, or by means of a weld connection to the carrier.

As an alternative in the first concept according to the invention for centering bearing, and as an additional possibility in the second bearing concept according to the invention, the inner carrier and the outer carrier are rigidly connected together as a common carrier, and the common carrier is radially supported in an assigned bearing hub on the central transmission shaft or on a bearing shaft of a centrally supported component of one of the two planetary gear sets or an axially adjacent assembly. Due to the radial support of the common carrier, which is a rigid coupling, preferably by means of a one-piece construction, of the carriers of the radially inner planetary gear set (inner carrier) and the radially outer planetary gear set (outer carrier), likewise means that a component of each of the two planetary gear sets that individually as well as coupled have the highest mass, can be centering in a space saving manner, using a single radial support.

The common carrier is preferably radially supported on a bearing shaft of the carrier that is coupled in a rotationally fixed manner to the inner ring gear and to the outer sun gear, or to the common gear component, or radially supported on a bearing shaft of a carrier of a further axially adjacent planetary gear set.

However, as an alternative to a radial support of two coupled components it is also possible that the inner sun gear is radially supported on the centrally disposed transmission shaft or on a bearing shaft of an axially adjacent assembly, and that the outer ring gear is coupled in a rotationally fixed manner via a synchronization gearing to a ring gear carrier, which is radially supported with a radial internal bearing hub on the central transmission shaft, or on a bearing shaft of a centrally supported component of one of the two planetary gear sets, or on an axially adjacent assembly.

The respective radial support can be implemented in a known manner in the form of a needle bearing or a plain bearing bushing disposed between the respective bearing hub and the central transmission shaft, or the bearing shaft of the centering supported component, wherein a double row embodiment of the radial support is expedient for avoiding tumbling movement of the affected component.

However a particularly cost-effective and space-saving radial support of the inner sun gear is also possible in that the inner sun gear is composed of steel and is radially supported directly on an aluminum bearing sleeve or a component of an axially adjacent assembly that is composed of aluminum, for instance a disk carrier of an axially adjacent friction shift element, wherein the bearing sleeve or the component is disposed on the central transmission shaft in a rotationally fixed manner and essentially free of radial play.

In this case it is also possible that the ring gear carrier of the outer ring gear is composed of aluminum and is radially supported with its assigned bearing hub directly on a bearing shaft of the inner sun gear.

The advantageous embodiments of multiple bearings presented in the following can be used as embodiments for supplementing or as alternatives to the previously stated radial supports of the two planetary gear sets.

In one preferred multiple bearing, which is based on the central support of a common gear component, the radial support of the common carrier is designed such that the common carrier is radially supported with an assigned bearing hub on a bearing shaft of the centered supported common gear component, via the carrier. In the case where the radial planes of the two planetary gear sets are slightly offset axially from each other, this bearing of the common carrier is particularly simple and space-saving because in this case, the bearing shaft can be disposed in a space saving manner in the area of the inner ring gear without a cover.

In this bearing arrangement, the ring gear carrier of the outer ring gear can be supported radially adjacent to the radial support of the common carrier, using an assigned bearing hub on a bearing shaft of the common carrier.

Furthermore, for such a radial support of the ring gear carrier it is also possible that the ring gear carrier is composed of aluminum and has a bearing hub located radially internally in which the steel inner sun gear is directly radially supported with a bearing shaft.

An alternative radial support of the common carrier can be realized in that the carrier is radially supported in an assigned bearing hub in a bearing shaft of the centered, supported carrier.

As an alternative to a known radial support using a needle bearing or a plain bearing bushing, the common carrier can be composed of aluminum and with a radially internal bearing hub can be radially supported directly on a steel angle disk of an axial bearing disposed between the carrier and support that is supported on a bearing shaft of the centered supported carrier.

A similar radial support of a common carrier consists in that the common carrier is composed of aluminum and is radially supported in a radially internal bearing hub directly on a bearing shaft of the carrier composed of steel.

A preferred multiple bearing that is based on a central support of a common carrier, can comprise a radial support of the common gear component in which the common gear component is radially supported on an assigned bearing shaft in a bearing hub of the centered supported common carrier. Also with this bearing arrangement in which the radial planes of the two planetary gear sets are slightly offset axially from each other, the bearing shaft of a common gear component can be disposed in a space saving manner in the area of the inner ring gear without a cover.

In this bearing arrangement, as well as in a corresponding bearing arrangement without a radial support of the common gear component on the carrier, the ring gear carrier of the outer ring gear can be radially supported in an assigned bearing hub, preferably radially adjacent to the area of the inner ring gear without a cover, on a bearing shaft of the centered supported common carrier.

In the case of the multiple bearings described above, which comprise a radial support of the common gear component coupled to the carrier via the assigned synchronization gearing, this synchronization gearing is expediently implemented with radial play to avoid forced movement.

Likewise in the case of the multiple bearings described above that comprise a radial support of the ring gear carrier coupled to the outer ring gear via the assigned synchronization gearing, this synchronization gearing is also implemented with radial play to avoid forced movement.

In a preferred multiple bearing that is based on the central support of the inner sun gear and the outer ring gear, or of the ring gear carrier of the outer ring gear, the common carrier is radially supported with an assigned bearing shaft in a bearing hub of the centered supported ring gear carrier.

As an alternative to a conventional support of the ring gear carrier using a bearing element disposed between the bearing shaft and the central transmission shaft or the bearing shaft and another centered supported component, such as a needle bearing or a plain bearing bushing, for the purpose of saving space and simplifying the assembly, the ring gear carrier can be composed of aluminum and can be radially supported in a radially internal bearing hub directly on a bearing shaft of an inner centered supported sun gear composed of steel.

In a preferred multiple bearing that is based on a central support of an inner sun gear, a radial support of the ring gear carrier is provided in which the ring gear carrier is composed of steel and is radially supported in a radially internal bearing hub directly on a bearing sleeve composed of aluminum, which in turn is radially supported directly on a bearing shaft of a centered supported inner sun gear composed of steel.

In order to avoid rotational speed differences at the bearing sleeve, it is expediently coupled in a rotationally fixed manner to a common carrier using a spline.

For avoiding tumbling movements in the described embodiment of the ring gear carrier composed of aluminum, it is preferable to provide this carrier with a startup web for support with respect to axially projecting planet bolts of the outer carrier, which are typically composed of steel.

An alternative, radial support of the ring gear carrier can be implemented in that the ring gear carrier is composed of steel and is radially supported in a radially internal bearing hub directly on a bearing shaft of a disk carrier of an axially adjacent friction shift element that is composed of aluminum, which is coupled, essentially free of radial play, to the inner sun gear using synchronization gearing.

With this bearing arrangement, additionally, the common carrier can be radially supported with respect to the ring gear carrier, in that the common carrier is composed of aluminum and is radially supported in a radially internal bearing hub directly on a bearing shaft of the ring gear carrier.

With the bearing arrangements described above, the inner sun gear is preferably radially supported in an assigned bearing hub directly on a bearing shaft of a disk carrier of an axially adjacent friction shift element, composed of aluminum, which is coupled essentially free of radial play to the central transmission shaft using a synchronization gearing.

The described centering bearings are to be considered as preferred embodiments whose features can be combined with each other in any arbitrary manner.

BRIEF DESCRIPTION OF THE DRAWINGS

For illustrating the invention, the description is accompanied by a drawings with exemplary embodiments. They show.

DETAILED DESCRIPTION OF THE PREFERRED EMBODIMENTS

In the following, several embodiments of the centering bearing of the gear set arrangement of two coaxially nested planetary gear sets according to the invention are explained in more detail using an example of an automatic transmission of planetary design according to FIG. 1 of the unpublished German patent application DE 10 2008 000 429.4 (published as DE 10 2008 000 429), in which this gear set arrangement forms an input side gear set.

Figure 22:
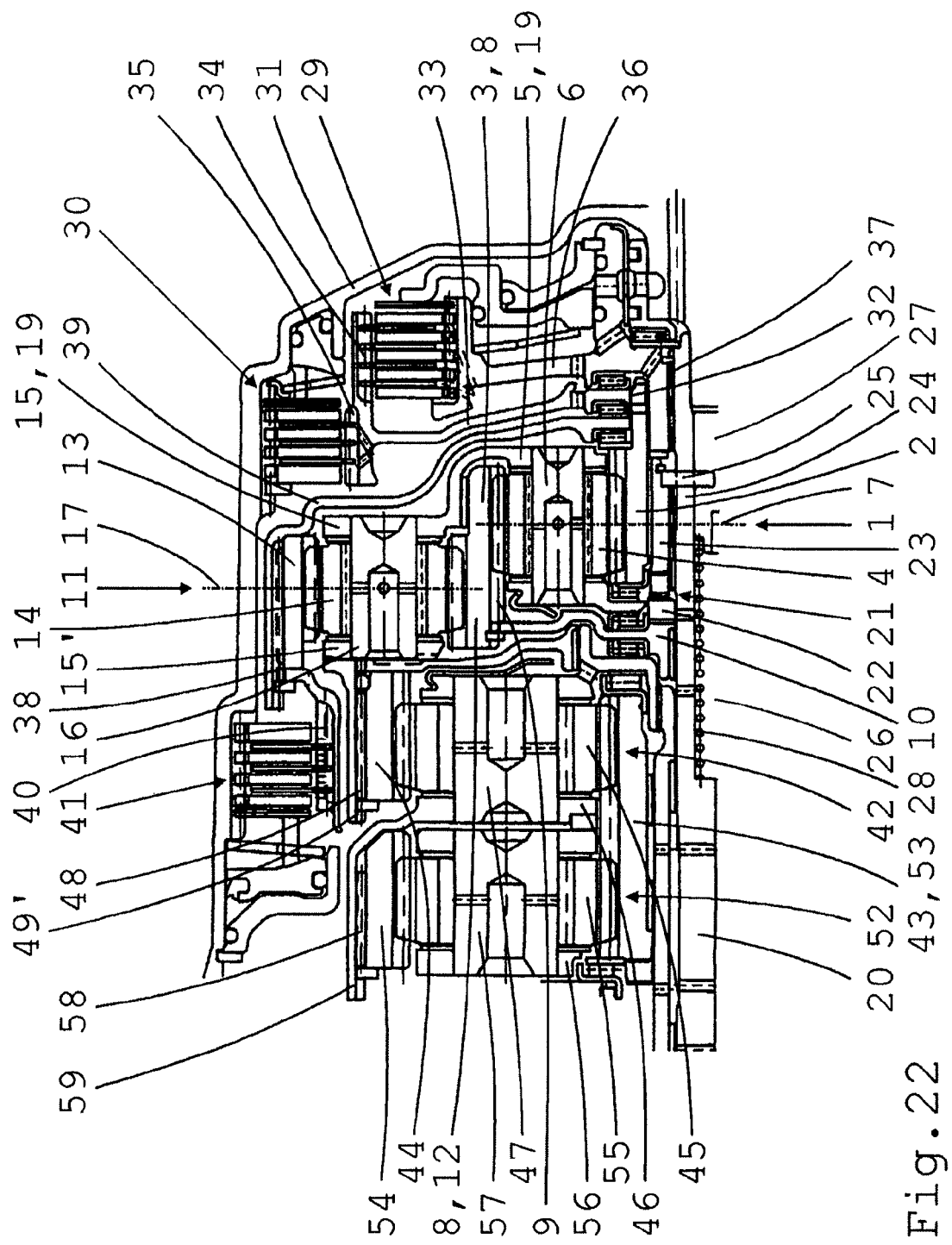

As seen in the largely complete sectional view in FIG. 22, the input side gear set is comprised of two simple planetary gear sets 1 and 11 each of which has a sun gear 2, 12, a ring gear 3, 13, and a carrier (planet carrier) 5, 15 supporting a plurality of planetary gears 4, 14. The planetary gears 4, 14 are each rotationally supported, using planetary bolts 6, 16, on the assigned carrier 5, 15 distributed about the periphery, and are in gear engagement with the assigned sun gear 2, 12 and the assigned ring gear 3, 13. The two planetary gear sets 1, 11 are disposed in radial planes 7, 17 which are slightly offset axially from each other, with a coaxial nesting arrangement of the first planetary gear set radially within the sun gear 12 of the second planetary gear set 11.

The inner ring gear 3 and the outer sun gear 12 are combined by a one-piece design into a common gear component 8, and thus are rigidly connected together, that is in a rotationally fixed manner and without axial or radial play. In most embodiments, the common gear component 8 can be coupled in a rotationally fixed manner via a synchronization gearing 9 to a disk shaped carrier 10, which can be connected using a clutch 21, designed as a dog clutch, to a centrally disposed input shaft 20.

Figure 12:
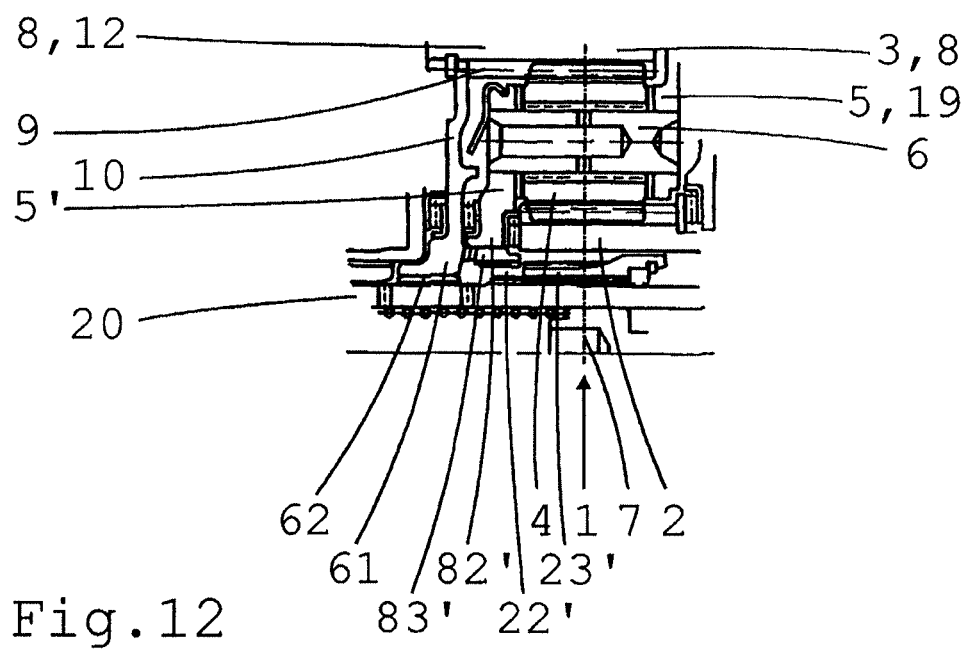

The dog clutch 21 comprises a carrier side clutch hub 22, 22' and a shaft side clutch sleeve 23, 23', which in the embodiment according to FIG. 12 are provided with an inner or outer spurred gearing, and in each of the other embodiments with a crown gearing. The clutch sleeves 23, 23' are each connected via a plurality of drivers 25, guided in slotted holes 24 of the input shaft 20, to a clutch piston 27 guided in a central bore hole 26 of the input shaft 20, which is axially movable in the engagement direction against the return force of a return spring 28 disposed in a central bore hole 26.

Figure 2:
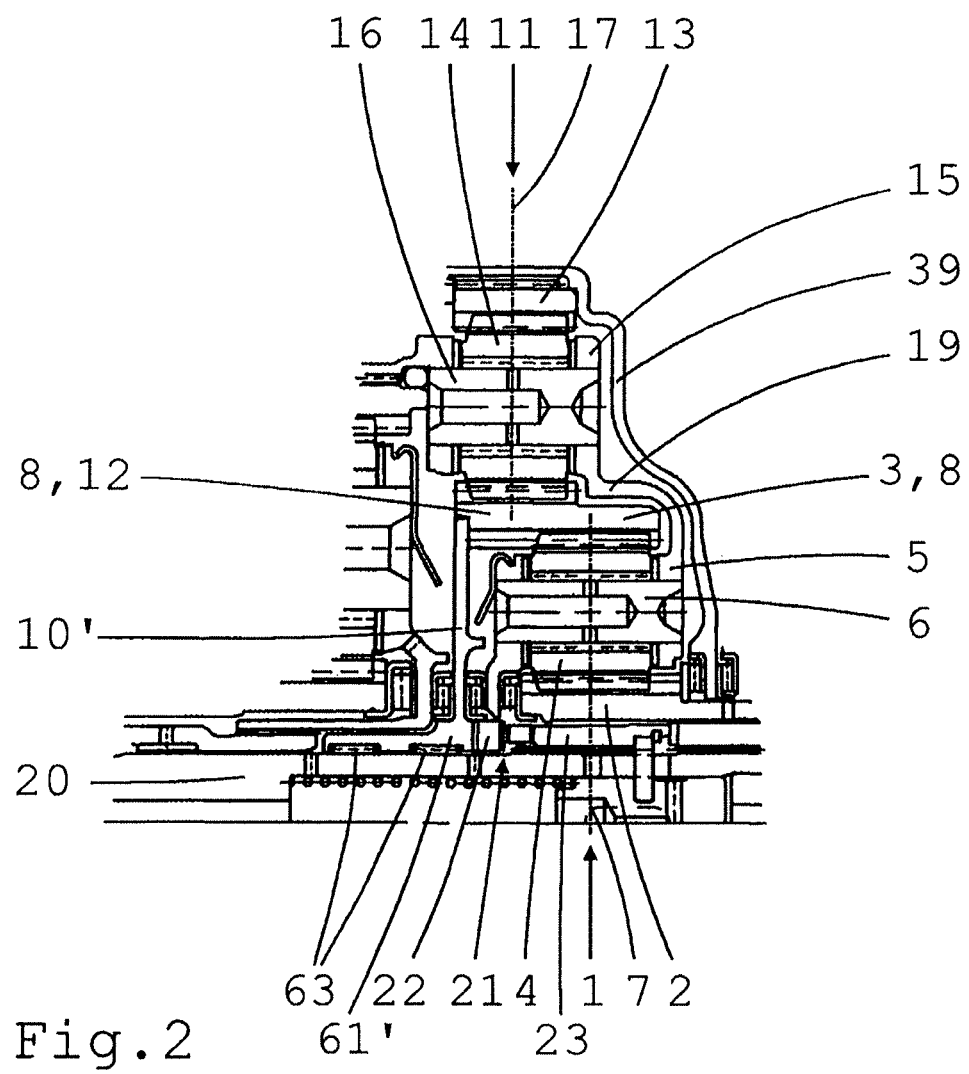

In the embodiment according to FIG. 2, the common gear component 8, in contrast to the remaining embodiments, is welded to the carrier 10', and thus rigidly connected thereto.

Figure 1:
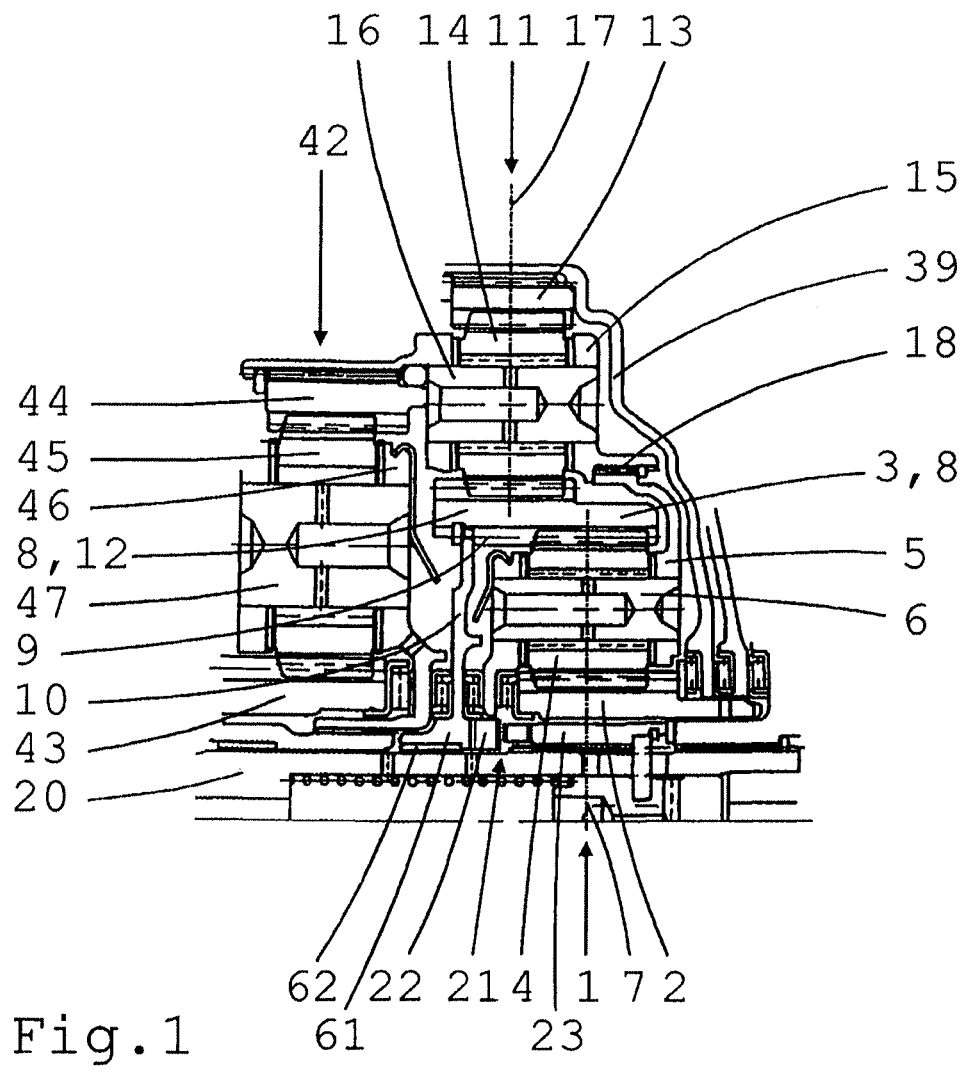
FIG. 1 a partial longitudinal central section of a first embodiment according to the invention of a simple centering bearing of a gear set arrangement of a transmission, FIG. 2 a partial longitudinal central section of a second embodiment according to the invention of a simple centering bearing of the gear set arrangement, FIG. 3 a partial longitudinal central section of a third embodiment according to the invention of a simple centering bearing of the gear set arrangement, FIG. 4 a partial longitudinal central section of a fourth embodiment according to the invention of a simple centering bearing of the gear set arrangement, FIG. 5 a partial longitudinal central section of a fifth embodiment according to the invention of a simple centering bearing of the gear set arrangement, FIG. 6 a partial longitudinal central section of a sixth embodiment according to the invention of a simple centering bearing of the gear set arrangement, FIG. 7 a partial longitudinal central section of a seventh embodiment according to the invention of a simple centering bearing of the gear set arrangement, FIG. 8 a partial longitudinal central section of a first embodiment according to the invention of a multiple centering bearing of the gear set arrangement, FIG. 9 a partial longitudinal central section of a second embodiment according to the invention of a multiple centering bearing of the gear set arrangement, FIG. 10 a partial longitudinal central section of a third embodiment according to the invention of a multiple centering bearing of the gear set arrangement, FIG. 11 a partial longitudinal central section of a fourth embodiment according to the invention of a multiple centering bearing of the gear set arrangement, FIG. 12 a partial longitudinal central section of a fifth embodiment according to the invention of a multiple centering bearing of the gear set arrangement, FIG. 13 a partial longitudinal central section of a sixth embodiment according to the invention of a multiple centering bearing of the gear set arrangement, FIG. 14 a partial longitudinal central section of a seventh embodiment according to the invention of a multiple centering bearing of the gear set arrangement, FIG. 15 a partial longitudinal central section of an eighth embodiment according to the invention of a multiple centering bearing of the gear set arrangement, FIG. 16 a partial longitudinal central section of a ninth embodiment according to the invention of a multiple centering bearing of the gear set arrangement, FIG. 17 a partial longitudinal central section of a tenth embodiment according to the invention of a multiple centering bearing of the gear set arrangement, FIG. 18 a partial longitudinal central section of an eleventh embodiment according to the invention of a multiple centering bearing of the gear set arrangement, FIG. 19 a partial longitudinal central section of a twelfth embodiment according to the invention of a multiple centering bearing of the gear set arrangement, FIG. 20 a partial longitudinal central section of a thirteenth embodiment according to the invention of a multiple centering bearing of the gear set arrangement, FIG. 21 a partial longitudinal central section of a fourteenth embodiment according to the invention of a multiple centering bearing of the gear set arrangement, and FIG. 22 the sectional view from FIG. 14 for explaining the overall design of the automatic transmission of planetary design that is the basis of the FIGS. 1 to 21.

The radially inner carrier 5 and the radially outer carrier 15 are coupled together in a rotationally fixed manner in the embodiment according to FIG. 1 using synchronization gearing 18. In all other embodiments, the two carriers 5, 15 are combined as one-piece in a common carrier 19, and are therefore rigidly connected together, that is in a rotationally fixed manner and without axial or radial play.

As shown further in FIG. 22, the inner sun gear 2 can be fixed with respect to the transmission housing 31 using a clutch 29, designed as a disk clutch, to the input shaft 20, and using a brake 30, designed as a disk brake. For this purpose, the radially inner sun gear 2 is coupled in a rotationally fixed manner using a spline or synchronization gearing 32 to a common carrier 33 of the outer disk carrier 34 of the clutch 29 and of the inner disk carrier 35 of the brake 30. The inner disk carrier 36 of the clutch 29 is coupled in a rotationally fixed manner to the input shaft 20, using a synchronization gearing 37.

The outer ring gear 13 is coupled in a rotationally fixed manner to a ring gear carrier 39, using a synchronization gearing 38. An inner disk carrier 40 of a further brake 41, designed as a disk brake, also engages in this synchronization gearing 38 and this brake can be used to fix the outer ring gear 13 with respect to the transmission housing 31.

The main gear set of the automatic transmission in a planetary design is comprised of two simple planetary gear sets 42, 52 that are coupled together, each having a sun gear 43, 53, a ring gear 44, 54, and a carrier (planet carrier) 46, 56 supporting a plurality of planetary gears 45, 55, whose planetary gears 45, 55 are each supported, using planetary bolts 47, 57, on the assigned carrier 46, 56 distributed on the periphery.

Two planetary gear sets 42, 52 are disposed axially adjacent to each other and axially adjacent to the two planetary gear sets 1, 11 of the input side gear set. The two planetary gear sets 42, 52 are coupled by a rotationally fixed connection of the two sun gears 43 and 53, which is implemented by a one-piece design of the sun gears 43, 53, and by a rotationally fixed connection of the carrier 46 of the first planetary gear set 42 to the ring gear 54 of the second planetary gear set 52, which is implemented by a one-piece connection of the carrier 46 to a ring gear carrier 59, connected to the ring gear 54 in a rotationally fixed manner using synchronization gearing 58.

A permanent coupling of the input side gear set to the main gear set consists in that the radially outer carrier 15 or the common carrier 19 of the input side gear set is connected in a rotationally fixed manner to the ring gear 44 of the first planetary gear set 42 of the main gear set. For this purpose, a ring gear carrier 49' coupled to the ring gear 44 in a rotationally fixed manner using a synchronization gearing 48, is welded to the axially adjacent part of the radially outer carrier 15'.

In a first embodiment of a simple centering bearing according to FIG. 1, in which, for avoiding forced movement, only one component of the two coaxially nested planetary gear sets 1, 11 is radially supported essentially free of radial play on a centrally disposed transmission shaft or with respect to another centered supported component, the radially inner ring gear 3 and the radially outer sun gear 12 are combined into one-piece in the common gear component 8, which is coupled in a rotationally fixed manner essentially without radial play, using synchronization gearing 9, to the disk shaped carrier 10.

The carrier 10 is radially supported in a radially inner bearing hub 61 using a bearing element, in this case designed as a plain bearing bushing 62, on the centrally disposed input shaft 20. Due to the centering bearing of the carrier 10, the clutch hub 22 of the clutch 21 is also centered. In order to avoid forced movement between the planetary gears 4, 14 and the common gear component 8, the synchronization gearing 18, via which the inner carrier 5 and the outer carrier 15 are coupled in a rotationally fixed manner, is preferably implemented with radial play.

A similar second embodiment of a simple centering bearing according to FIG. 2 differs from the first embodiment according to FIG. 1 in that a common gear component 8 is rigidly connected to the carrier 10' by means of a welded connection, that in order to avoid tumbling movements the carrier 10' is radially supported on the input shaft 20 in an axially extended bearing hub 61' using a double row needle bearing 63, and in that the two carriers 5, 15 are combined rigidly into a one-piece common carrier 19. This embodiment is particularly cost-effective to implement even with tight tolerances.

Figure 3:
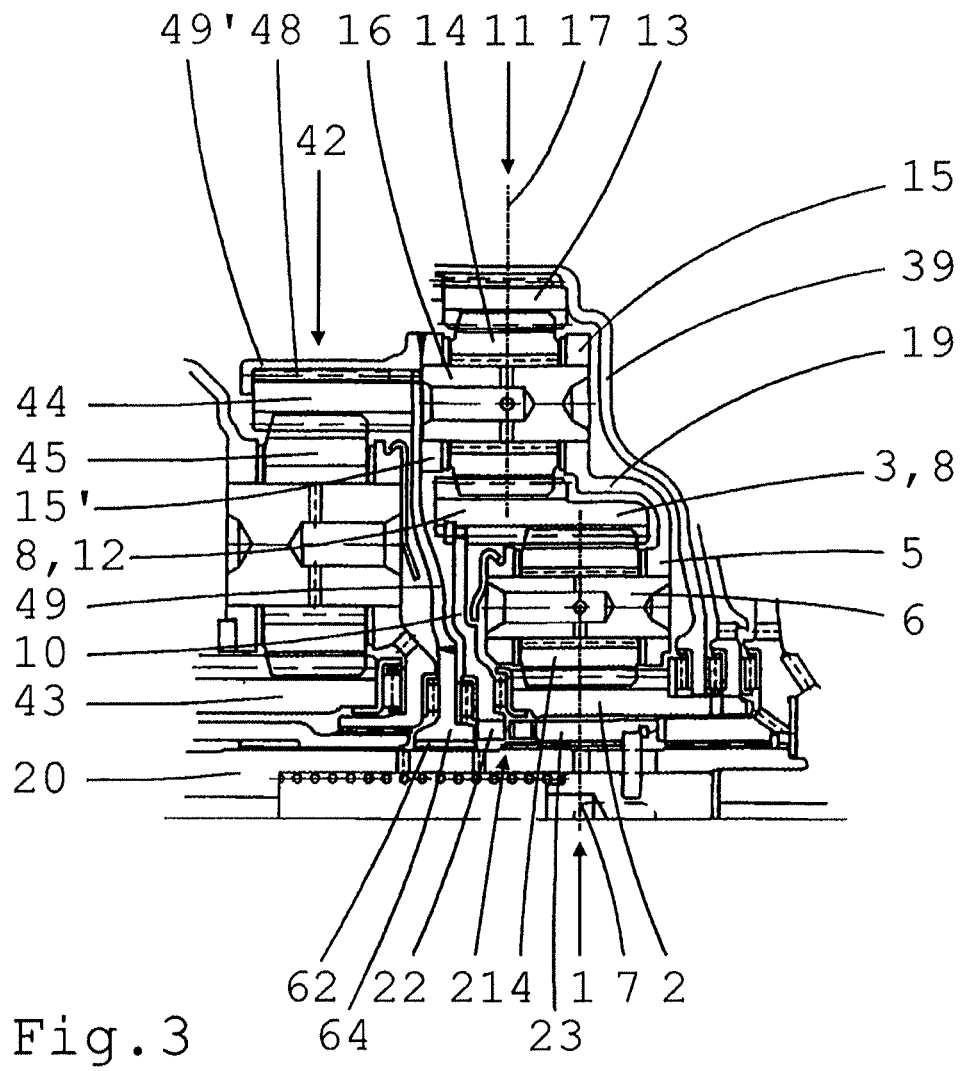

In a third embodiment of a simple centering bearing according to FIG. 3, the common carrier 19 which forms the heaviest component of the two planetary gear sets 1, 11, is supported centered using a carrier 49. For this purpose, the ring gear carrier 49' of the adjacent planetary gear set 42 that is welded to the axially adjacent part of the outer carrier 15' is centered on the carrier 49 using the synchronization gearing 48, where the carrier 49 is welded to a bearing hub 64 which is radially supported on the input shaft 20, using a bearing element formed as a plain bearing bushing 62.

Figure 4:
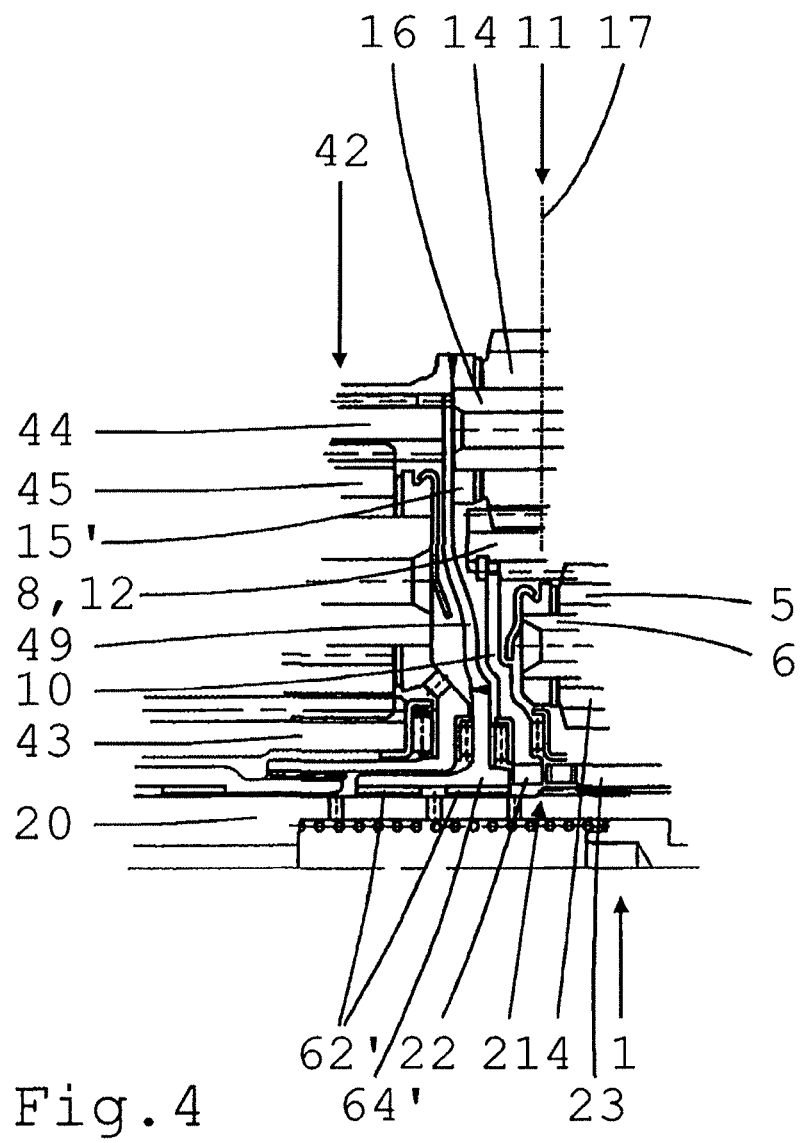

To avoid tumbling movements, the bearing element in the embodiment according to FIG. 4, in contrast to the embodiment according to FIG. 3, is connected to an axially lengthened bearing hub 64', formed as a double row plain bearing bushing 62'.

Figure 5:
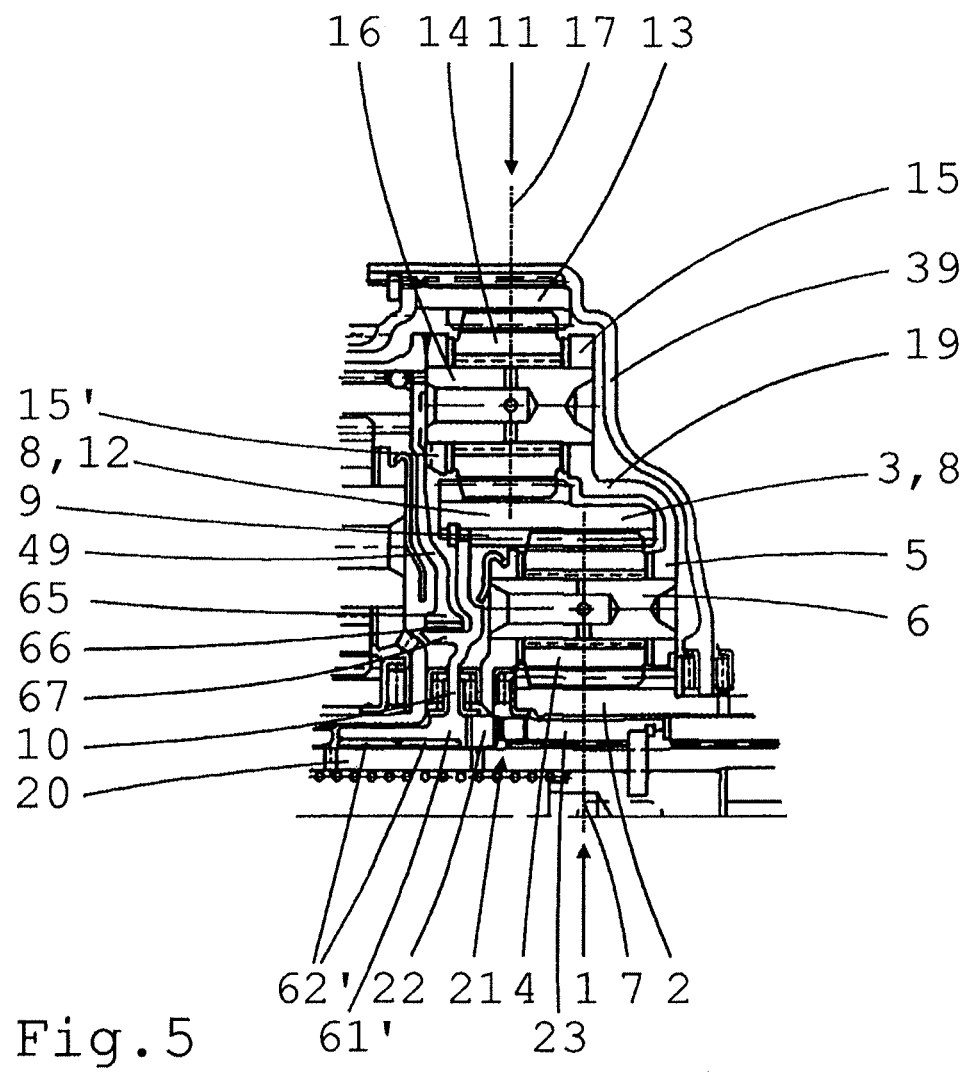

In the embodiment according to FIG. 5, the carrier 49 disposed axially adjacent to the outer carrier 15', is radially supported in an assigned bearing hub 65 using a bearing element formed as a plain bearing bushing 66 on a bearing shaft 67 of the carrier 10, which in turn is radially supported with an axially lengthened bearing hub 61' using double row plain bearing bushing 62' on the input shaft 20. In order to avoid forced movement between the planetary gears 4, 14 and the common gear component 8, the synchronization gearing 9 between the common gear component 8 and the carrier 10 is implemented with radial play.

Figure 6:
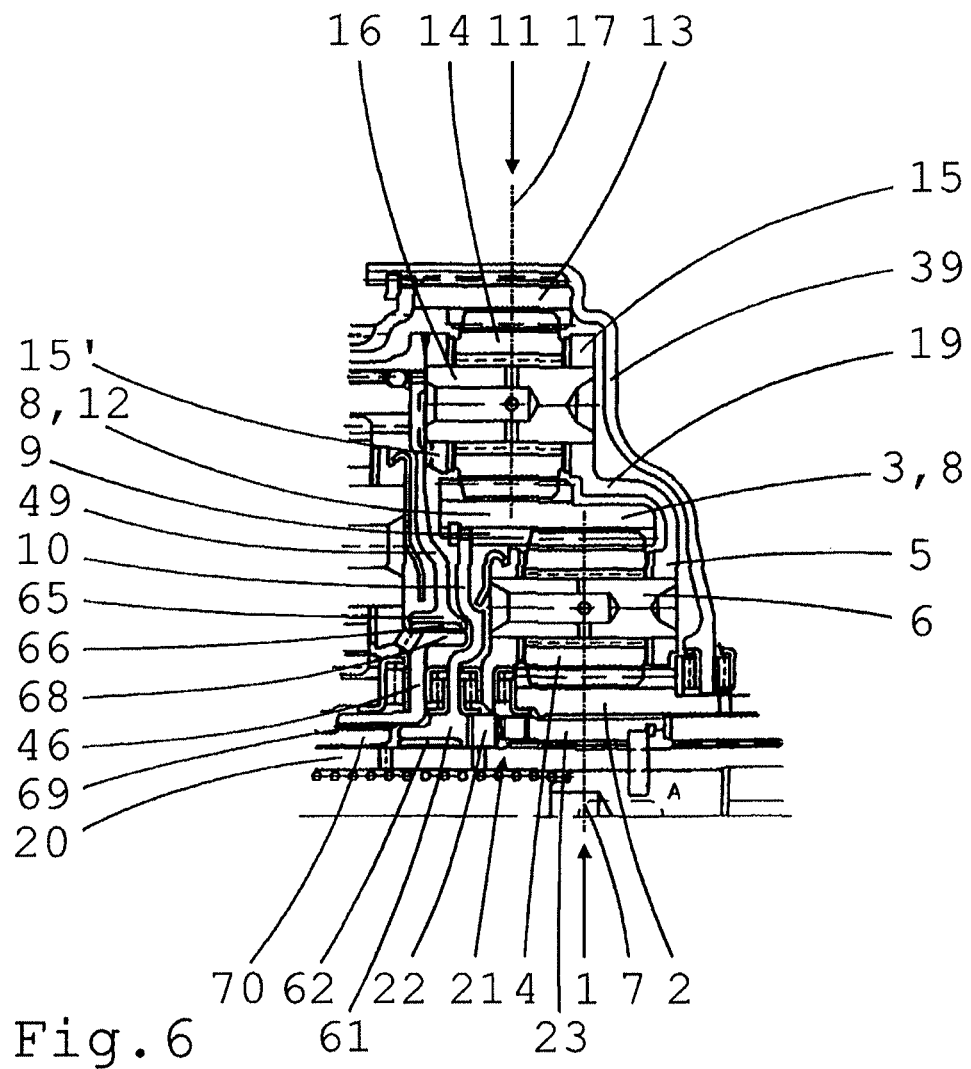

A similar sixth embodiment of a simple centering bearing according to FIG. 6 differs from the fifth embodiment according to FIG. 5 in that the carrier 49 is radially supported in the assigned bearing hub 65 using a bearing element designed as a plain bearing bushing 66, now on a bearing shaft 68 of the carrier 46 of the axially adjacent planetary gear set 42, which for its part is connected by means of a synchronization gearing 69 in a rotationally fixed manner essentially free of radial play to a hollow shaft 70 supported on the input shaft 20.

Figure 7:
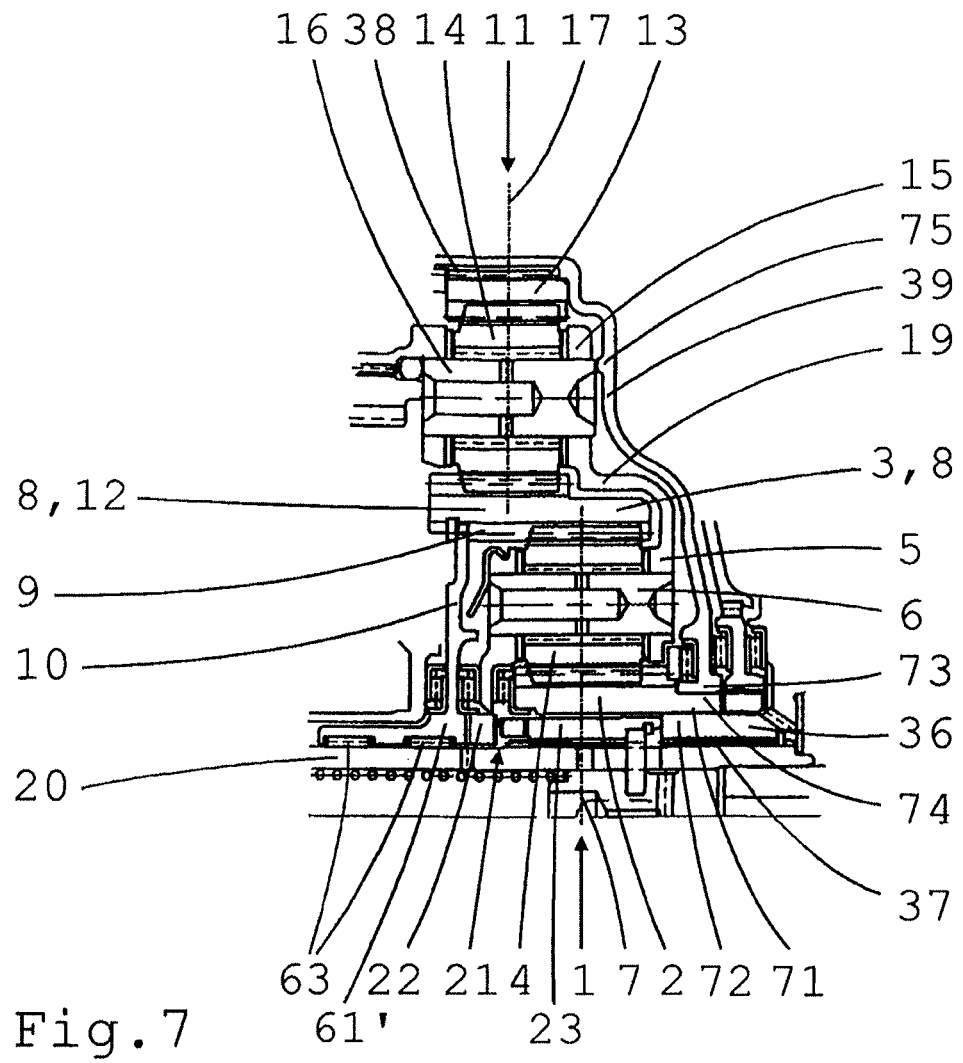

In a seventh embodiment of a simple centering bearing according to FIG. 7, the components that rotate the fastest, namely the inner sun gear 2 and the outer ring gear 13, are supported centered. For this purpose, the inner sun gear 2, composed of steel, is radially supported in an assigned bearing hub 71 directly on a bearing shaft 72 of the inner disk carrier 36, composed of aluminum, of the clutch 29, which for its part, is connected by means of synchronization gearing 37 to the input shaft 20 in a manner free of radial play. The outer ring gear 13 is connected by means of the assigned synchronization gearing 38 to the ring gear carrier 39, made of aluminum, in a manner essentially free of radial play, and is radially supported in a radially inner bearing hub 73 directly on a bearing shaft 74 of the steel inner sun gear 2.

In the variant embodiment according to FIG. 7, in order to avoid tumbling movements, the ring gear carrier 39 has an axially inner startup web 75 for support with respect to the axially projecting planet bolt 16 of the outer carrier 15. In this case, the common gear component 8 is connected to the carrier 10, corresponding to the embodiment according to FIG. 1, in a rotationally fixed manner using the synchronization gearing 9 and axially secured by means of a retaining ring, which for its part is radially supported, as in the variant embodiment according to FIG. 2, by means of a double row needle bearing 63 on the input shaft 20, where the synchronization gearing 9 is implemented with radial play in order to avoid forced movement.

Figure 8:
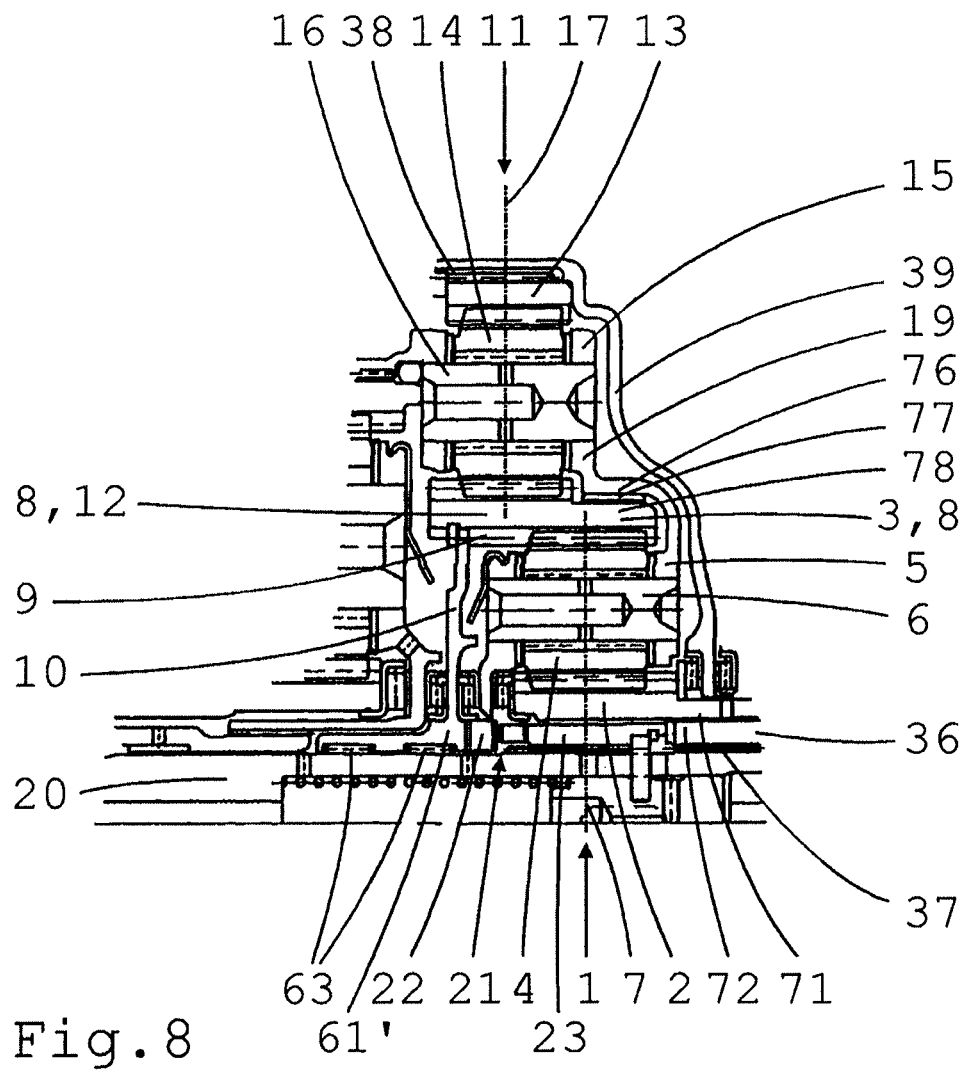

In a first embodiment of a multiple centering bearing according to FIG. 8, in which at least two components of one of the planetary gear sets 1, 11 that are disposed coaxially nested, are radially supported on a centrally disposed transmission shaft or with respect to another centered supported component, the common gear component 8 serving as the ring gear and the sun gear, corresponding to the variant embodiment according to FIG. 7, is connected in a rotationally fixed manner by means of a synchronization gearing 9 to the carrier 10, which for its part is radially supported using a double row needle bearing 63 on the input shaft 20. In this embodiment, the centering bearing of a common gear component 8 forms the basis of support. As a consequence, in this case the synchronization gearing 9 is implemented essentially without radial play. In addition, in this embodiment the common carrier 19 with an assigned bearing hub 76 is radially supported using a plain bearing bushing 77 on a bearing shaft 78 of the common gear component 8. This centering bearing of a common carrier 19 can be realized in a particularly simple and space-saving manner because the bearing shaft 78 of a common gear component 8 is expediently disposed in an area of the inner ring gear 3 that has no covering due to the axial offset of the two radial planes 7, 17.

Figure 9:
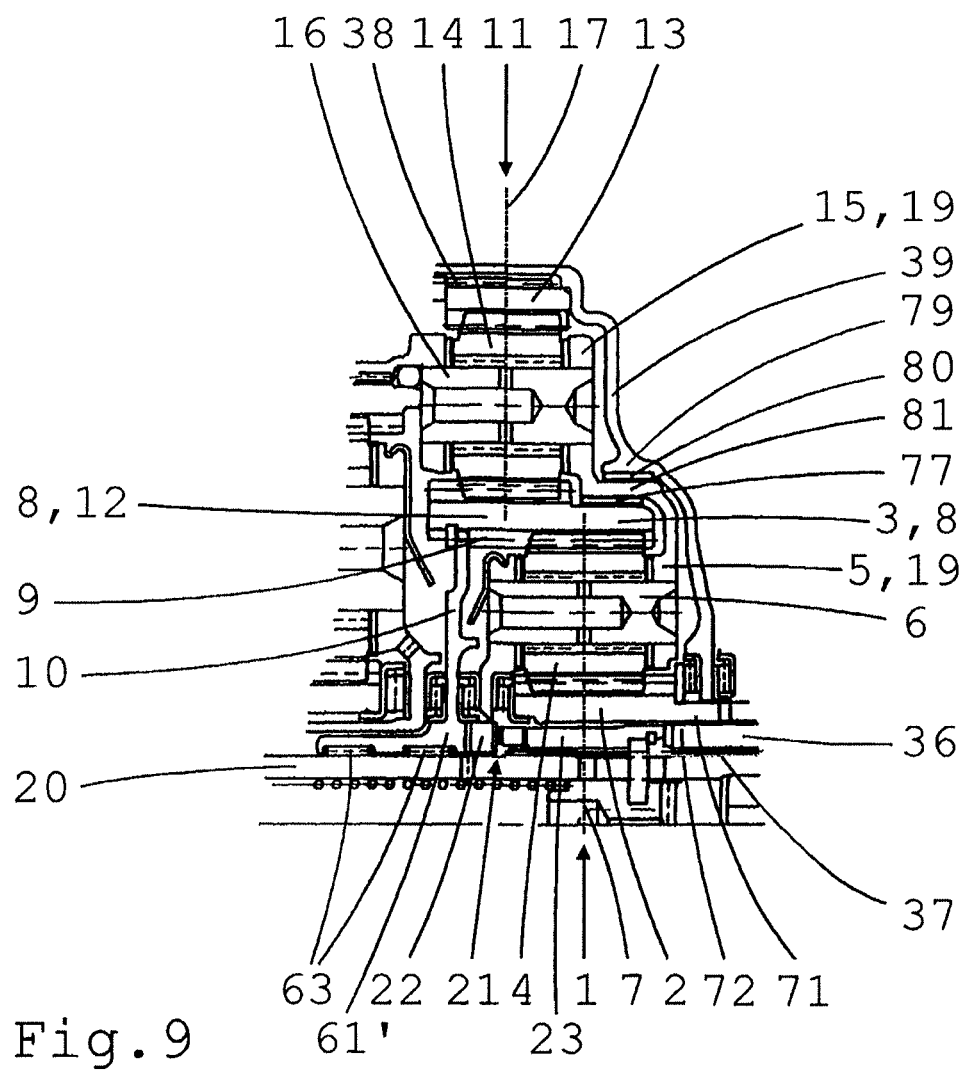

According to FIG. 9, in a further development of this bearing arrangement, the ring gear carrier 39 is also radially supported, radially adjacent to the radial support of the common carrier 19 in an assigned bearing hub 79 using a plain bearing bushing 80 on a bearing shaft 81 of the common carrier 19.

Figure 10:
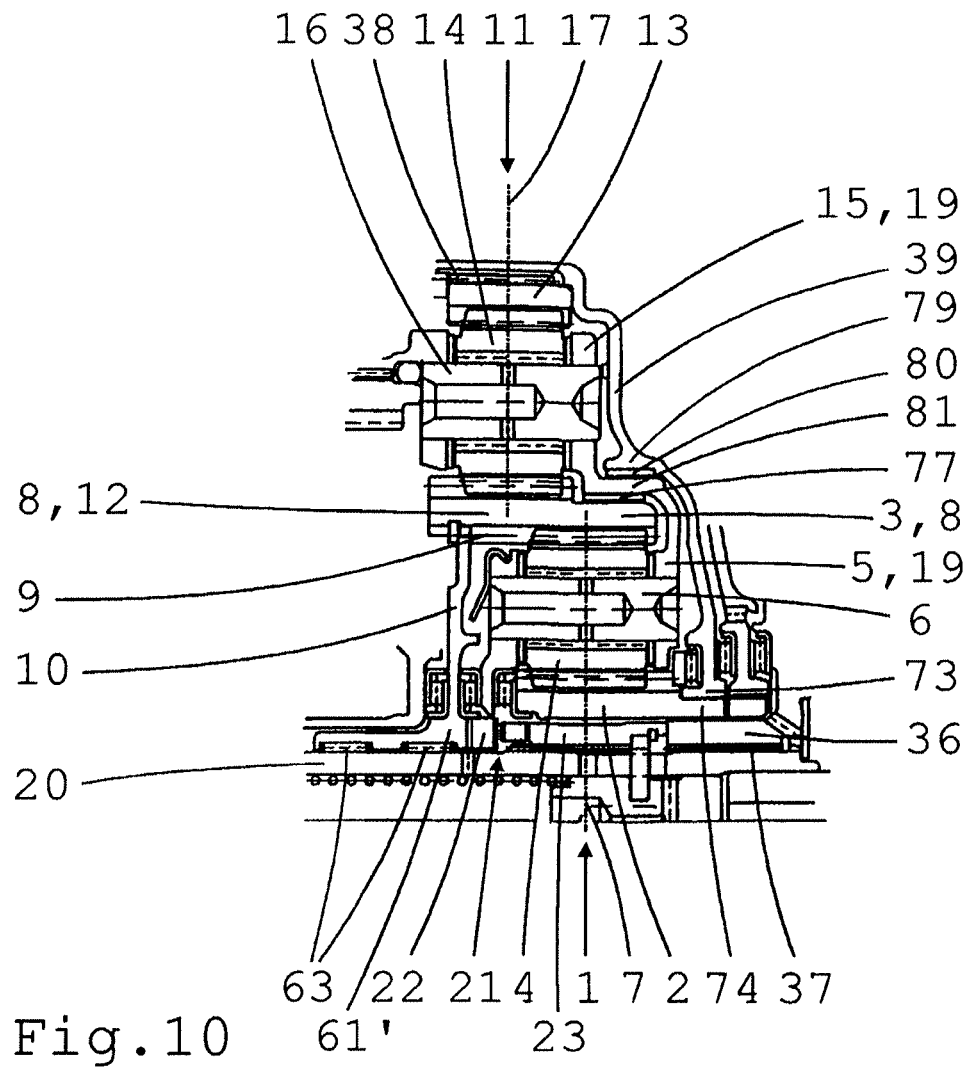

In an advantageous further development of this bearing arrangement according to FIG. 10, the ring gear carrier 39 is composed of aluminum and on its radial interior has a bearing hub 73 in which the inner sun gear 2, composed of steel, is radially supported directly with a bearing shaft 74.

Figure 11:
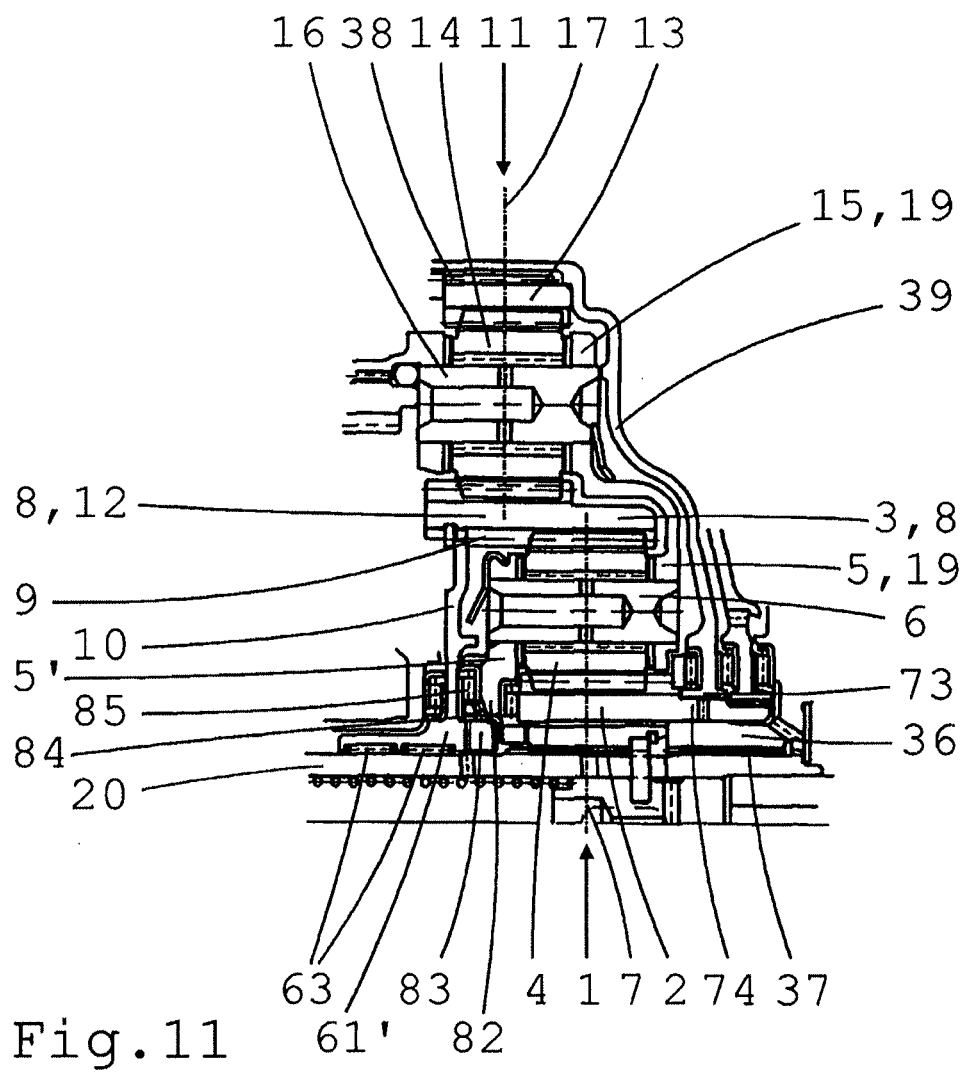

FIG. 11 shows an alternative radial support of the common carrier 19 with respect to the common component 8 or its carrier 10 in which the part of the inner carrier 5', which is axially adjacent to the carrier 10 of the common gear component 8, is composed of aluminum, where this carrier 5 is radially supported with a bearing hub 82 disposed radially inside on a steel angle disk 84, supported on bearing shaft 83 of the centered supported carrier 10, of an axial bearing 85 disposed between the inner carrier 5' and the carrier 10. The area of the angle disk 84 is formed lengthened axially for the purpose of radially supporting the carrier 5'.

FIG. 12 shows a similar radial support of the common carrier 19, where at least the part of the inner carrier 5', which is axially adjacent to the carrier 10 of the common gear component 8, is composed of aluminum, and is radially supported with bearing hub 82' disposed radially inside directly on a bearing shaft 83' of the steel carrier 10. In this embodiment, for the purpose of saving space, the carrier side coupling hub 22' and the shaft side coupling sleeve 23' of the clutch 21 have an inner or an outer spurred gearing. In this variant, in contrast to the embodiment of FIG. 11, the special design of the angle disk 84 can be eliminated.

Figure 13:
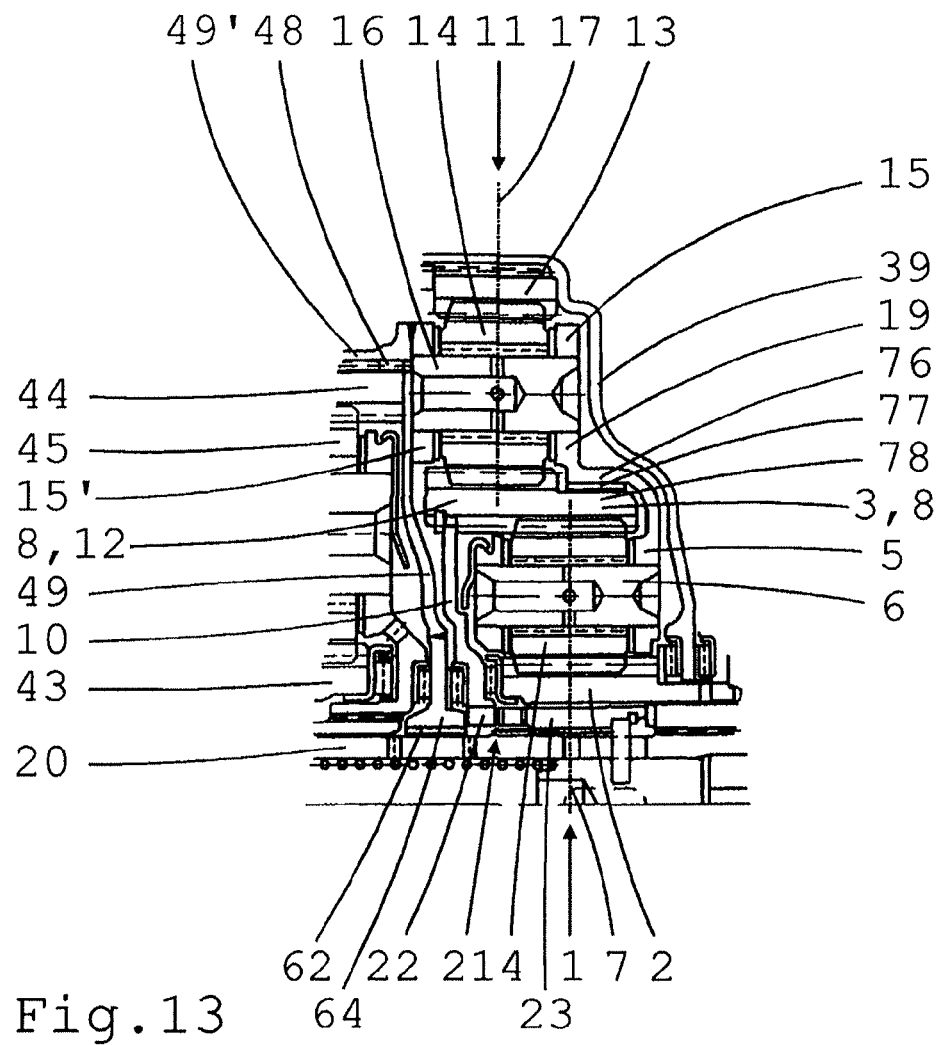

According to FIG. 13, a further multiple centering bearing is based on the radial support of the common carrier 19; the carrier 19 is radially supported on the input shaft 20, according to the variant embodiment according to FIG. 3, in which the ring gear carrier 49' of the planetary gear set 42 that is welded to the axially adjacent part of the outer carrier 15', is centered using the synchronization gear 48 on the carrier 49, where the carrier 49 is welded to a bearing hub 64, which is radially supported using a bearing element formed as a plain bearing bushing 62 onto the input shaft 20. Now the common gear component 8 is also radially supported across from the common carrier 19 in an area of the inner ring gear 3 that has no cover, using a plain bearing bushing 77 disposed between a bearing shaft 78 of the common gear component 8 and a bearing hub 76 of the common carrier 19.

Figure 14:
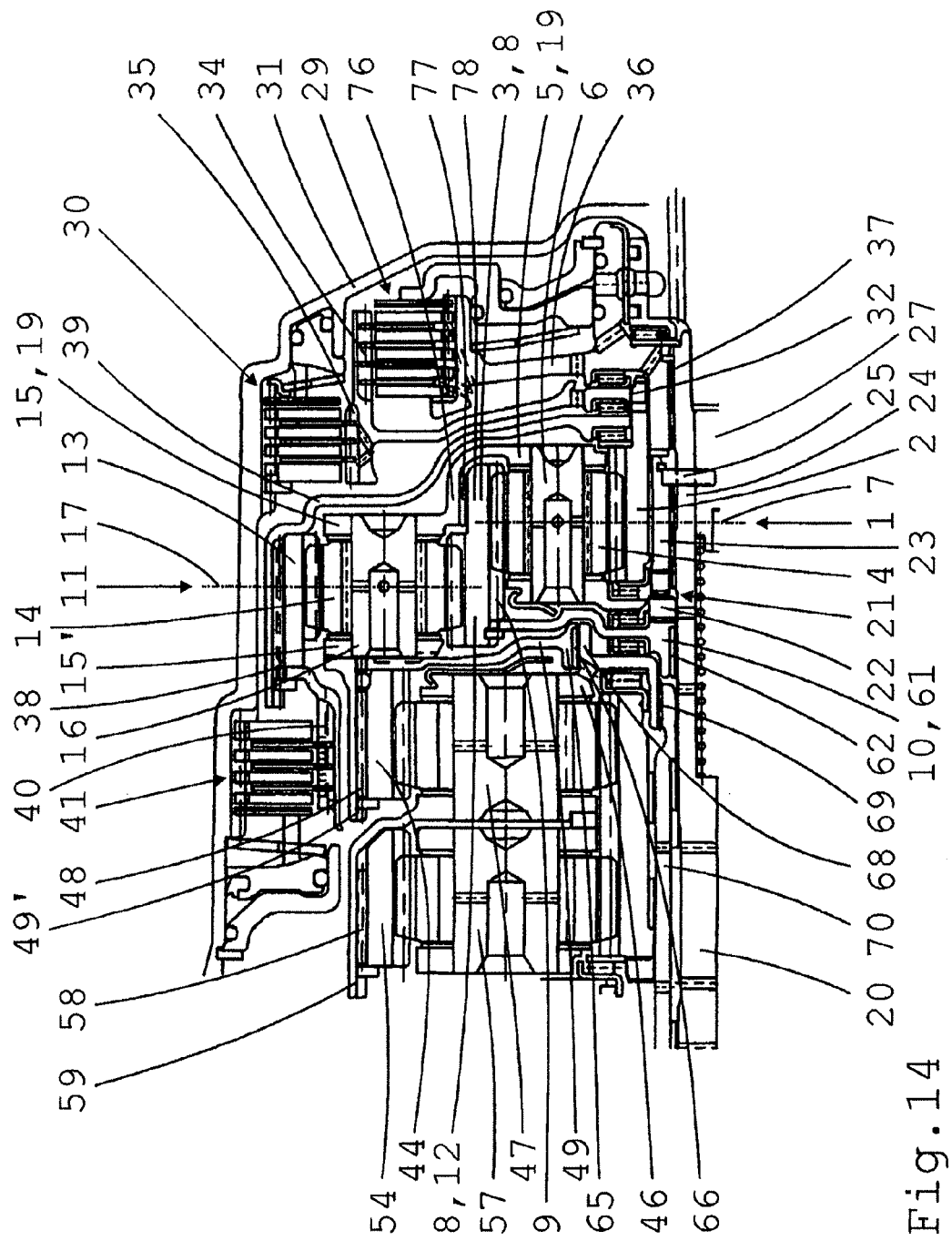

In a similar bearing arrangement of a multiple centering bearing according to FIG. 14, the carrier 49 corresponding to the embodiment according to FIG. 6, is radially supported on the assigned bearing hub 65 using a plain bearing bushing 66 on a bearing shaft 68 of the carrier 46 of the axially adjacent planetary gear set 42. In this embodiment, because the carrier 10 of the common gear component 8 is also radially supported on the radially inner bearing hub 61 using the plain bearing bushing 62 on the centrally disposed input shaft 20, the synchronization gearing 9 between the gear component 8 and the carrier 10 is implemented with radial play, for avoiding a statically over determined radial support of the gear component 8.

Figure 15:
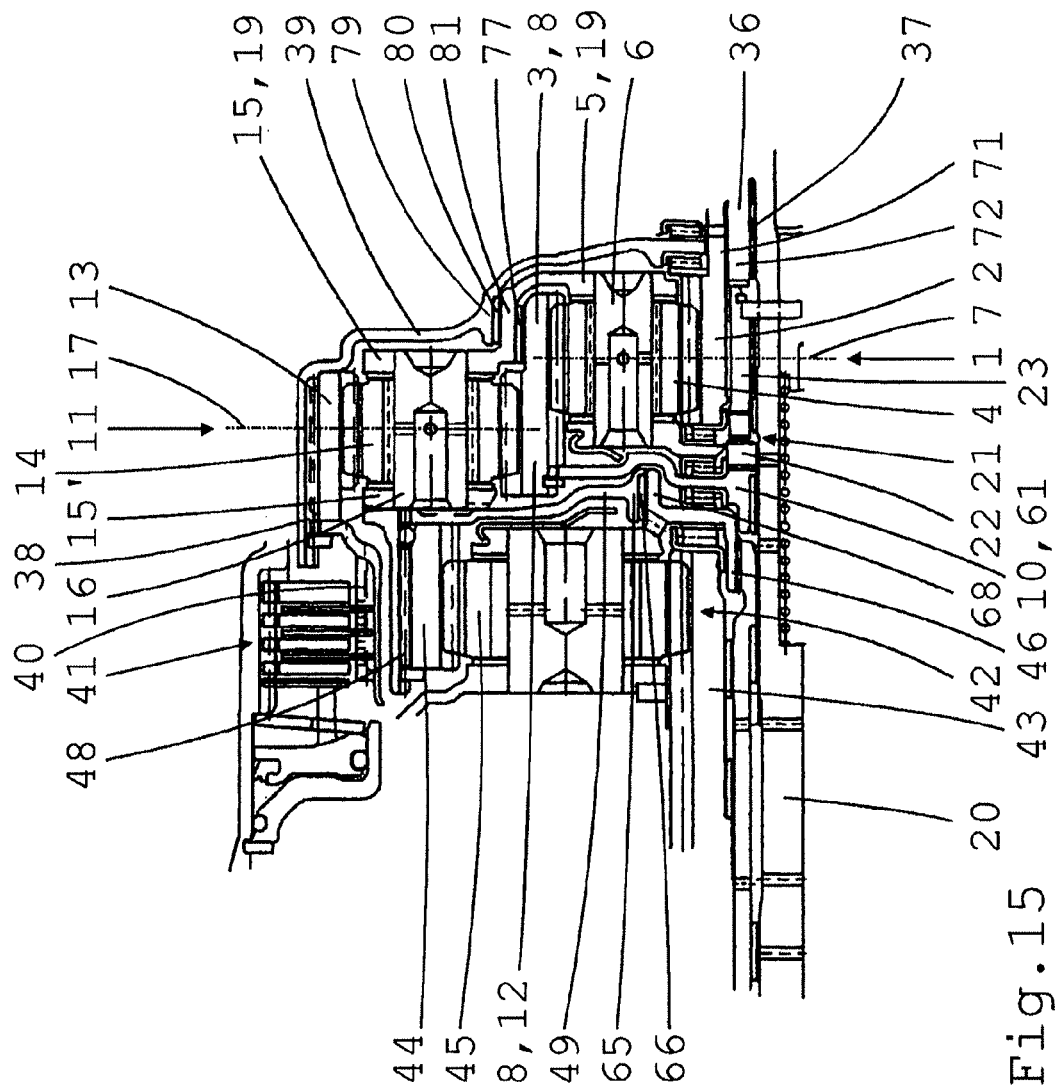

In a further development of the bearing arrangement according to FIG. 15, the ring gear carrier 39 of the outer ring gear 13 is also radially supported radially adjacent to the radial support of the common gear component 8, with an assigned bearing hub 79 using a plain bearing bushing 80 on a bearing shaft 81 of the common carrier 19.

Figure 16:
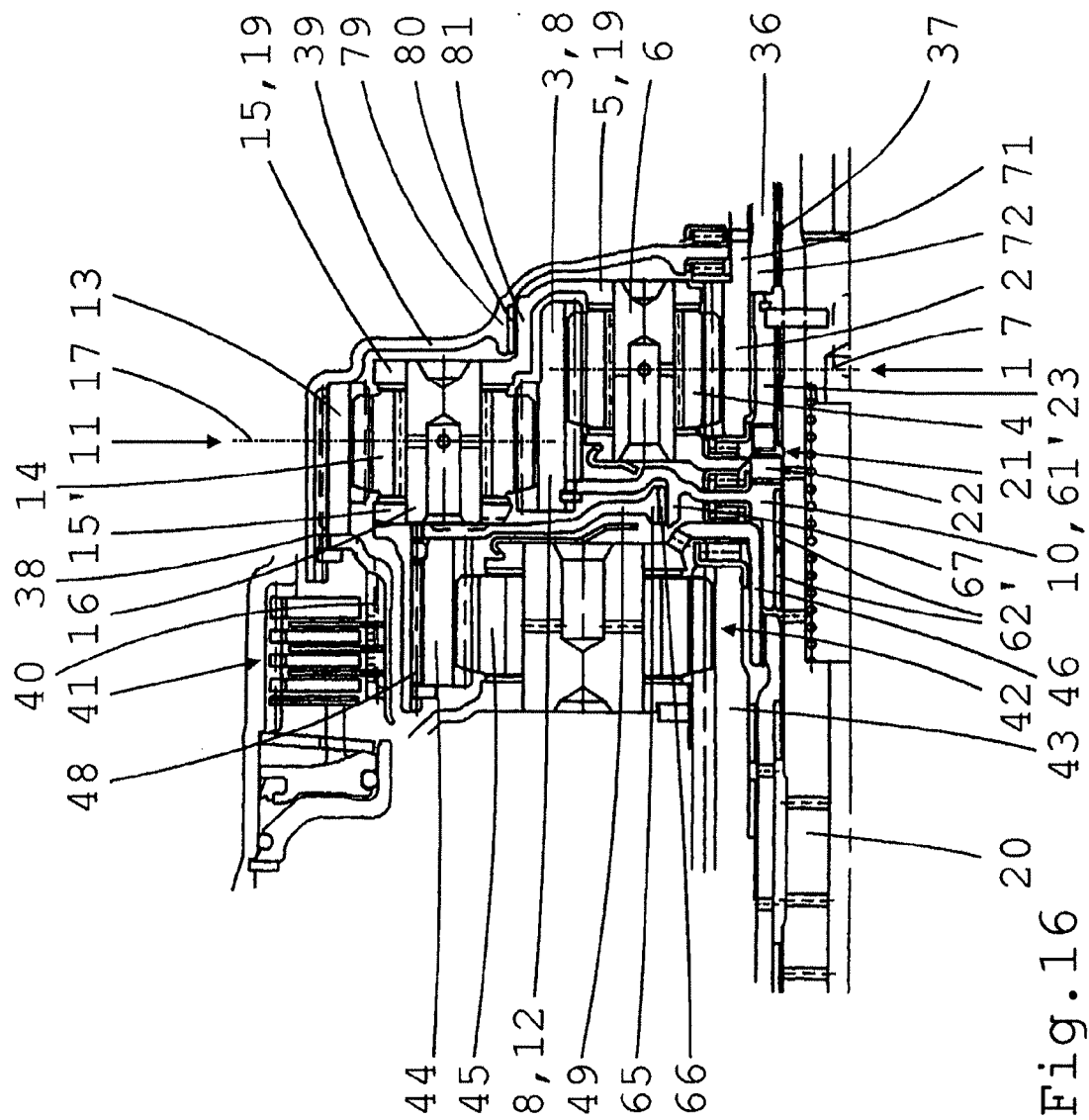

In another embodiment of a multiple bearing according to FIG. 16 which is based on a centering bearing of the common carrier 19, the carrier 49, axially adjacent to the outer carrier 15', corresponding to the embodiment according to FIG. 5, is radially supported in an assigned bearing hub 65 on a bearing shaft 67 of the carrier 10 using a bearing element implemented as a plain bearing bushing 66. The carrier 10 supporting the common gear component 8 via the synchronization gearing 9 is radially supported on an axially lengthened bearing hub 61' using a double row plain bearing bushing 62' on the input shaft 20 (see FIG. 5). Without a further radial support of the common gear component 8, the ring gear carrier 39 of the outer ring gear 13 is radially supported near the cover-free area of the inner ring gear 3, corresponding to the embodiment according to FIG. 15, in an assigned bearing hub 79 on a bearing shaft 81 of the common carrier 19 using a plain bearing bushing 80.

Figure 17:
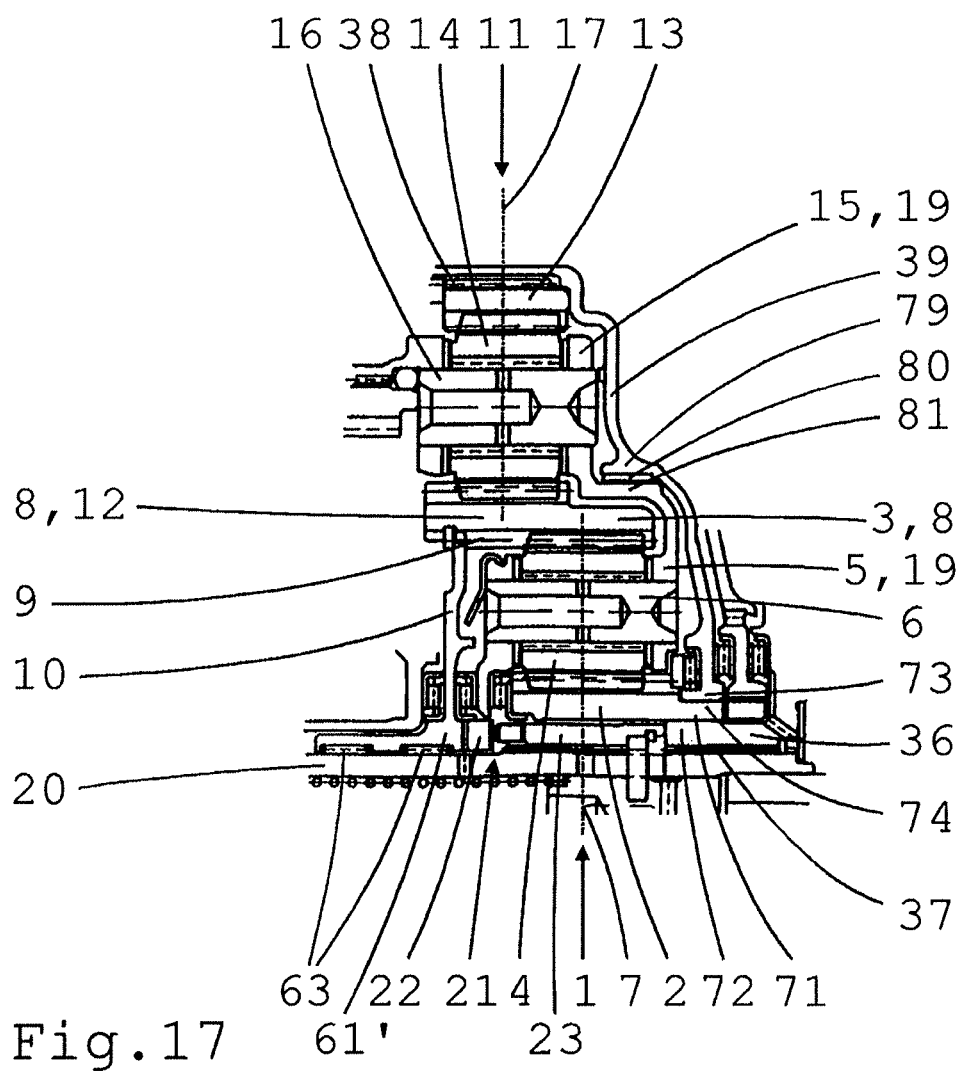

In another embodiment of a multiple centering bearing according to FIG. 17 which is based on the inner sun gear 2 and the outer ring gear 13, the steel inner sun gear 2, corresponding to the embodiment according to FIG. 7, is supported in an assigned bearing hub 71 directly on a bearing shaft 72 of the aluminum inner disk carrier 36 of the clutch 29. Additionally, the outer ring gear 13 is connected essentially without radial play by means of the associated synchronization gearing 38 to the ring gear carrier 39 that is composed of aluminum and is supported radially at a radially inner bearing hub 73 directly on a bearing shaft 74 of the inner sun gear 2. In addition, the common carrier 19 is radially supported near the cover-free area of the inner ring gear 3 on an assigned bearing shaft 81 by means of a plain bearing bushing 80 on a bearing hub 79 of the ring gear carrier 39. In this variant embodiment, because the carrier 10 of the common gear component 8 is also radially supported at the radially inner bearing hub 61' by means of the needle bearing 63 of the input shaft 20, the synchronization gearing 9 between the gear component 8 and the carrier 10 is implemented with radial play in order to avoid forced movement between the common gear component 8 and the planetary gears 4, 14 of the common carrier 19.

Figure 18:
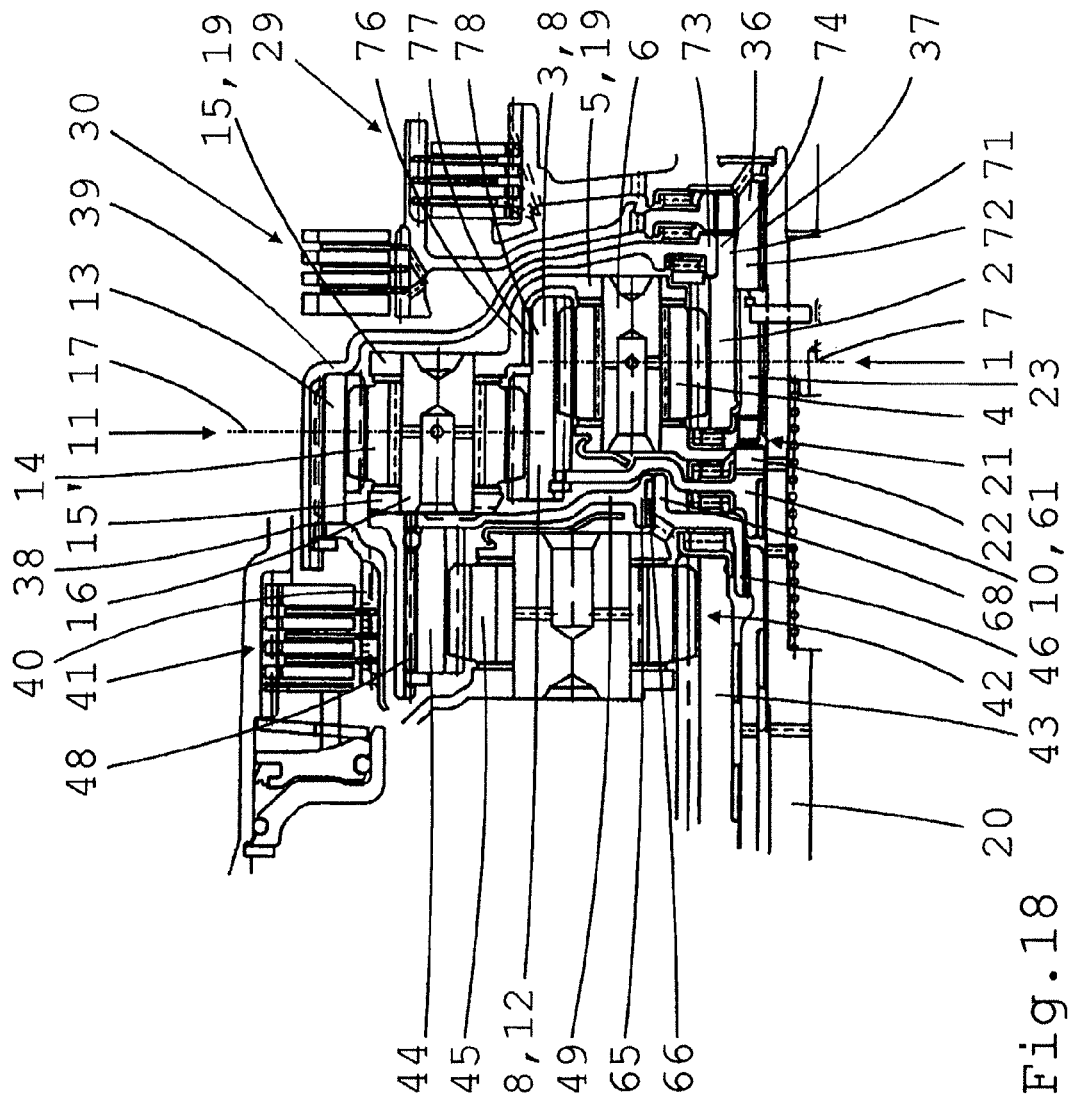

In another embodiment of a multiple centering bearing according to FIG. 18 which is based on radial support of the inner sun gear 2 and the outer ring gear 13, the inner sun gear 2 and the ring gear carrier 39 of the outer ring gear are centered in a manner identical to that of the embodiment according to FIG. 17, described above. Additionally, the common carrier 19 is supported centered by means of the carrier 49 disposed actually adjacent to the outer carrier 15', which, corresponding to the embodiment according to FIG. 6, is radially supported at the associated bearing hub 65 using a bearing element designed as a plain bearing bushing 66, on a bearing shaft 68 of the carrier 46 of the axially adjacent planetary gear set 42. Furthermore, the common gear component 8 is radially supported using a centrally supported carrier 10 and in the cover-free area of the inner ring gear 3 using a plain bearing bushing 77 disposed between a bearing shaft 78 of the common gear component 8 and a bearing hub 76 of the common carrier 19. In this embodiment, the synchronization gearing 9 between gearing component 8 and the carrier 10 is expediently implemented with radial play in order to avoid statically over defined radial support of the gear component 8, and the synchronization gearing 38 between the outer ring gear 13 and the ring gear carrier 39 is expediently implemented with radial play in order to avoid forced movement between the outer ring gear 13 and the planetary gears 14 of the outer carrier 15.

Figure 19:
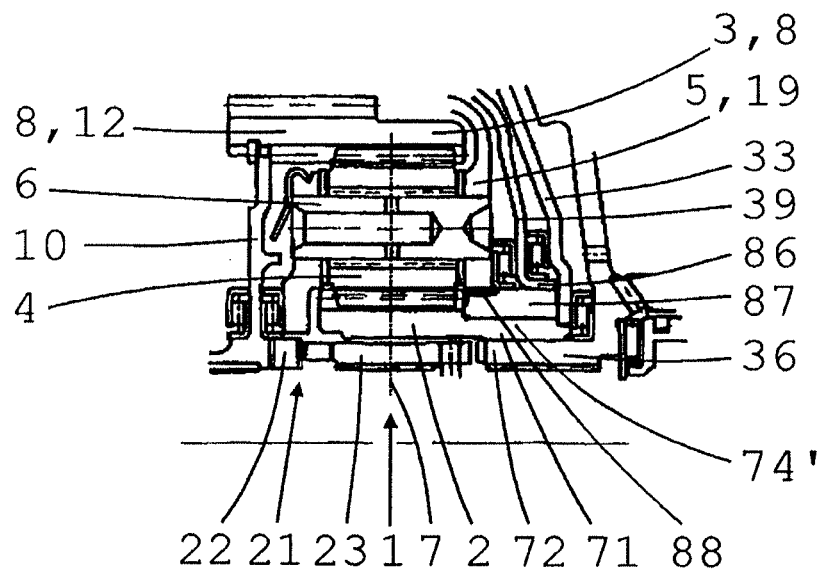

In a further embodiment of such a multiple centering bearing according to FIG. 19, the ring gear carrier 39 is composed of steel and is radially supported on a bearing hub 86 disposed radially inside, directly on an aluminum bearing sleeve 87, which in turn is radially supported directly on a bearing shaft 74' of the centered supported inner sun gear 2, composed of steel. In order to avoid rotational speed differences at the bearing sleeve 87, it is coupled in a rotationally fixed manner to the common carrier 19 using a spline 88. In this case, the common carrier 33 of the outer disk carrier 34 of the clutch 29 and the inner disk carrier 35 of the brake 30 (see FIG. 14) are produced from steel, and welded to the inner sun gear 2.

Figure 20:
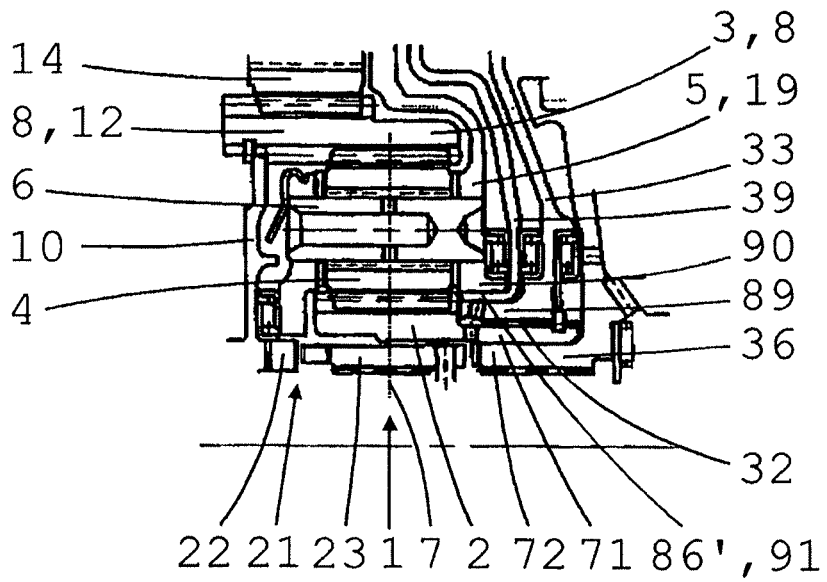

A similar embodiment of such a multiple centering bearing according to FIG. 20 differs from the variant embodiment according to FIG. 19, described above, in that the common carrier 33 of the outer disk carrier 34 of the clutch 29 and the inner disk carrier 35 of the brake 30 is no longer produced from aluminum, and is coupled in a manner that is rotationally fixed and essentially free of radial play, to the inner sun gear 2 by means of a synchronization gearing 32. In this embodiment, the ring gear carrier 39 of the ring gear 13 is produced of steel, and radially supported on a radially inner bearing hub 86' directly on a bearing shaft 89 of the common carrier 33. Adjacent to the radial support, the common carrier 19, in this case composed of aluminum, is radially supported using a radially internal bearing hub 90 directly on a bearing shaft 91 of the ring gear carrier 39.

Figure 21:
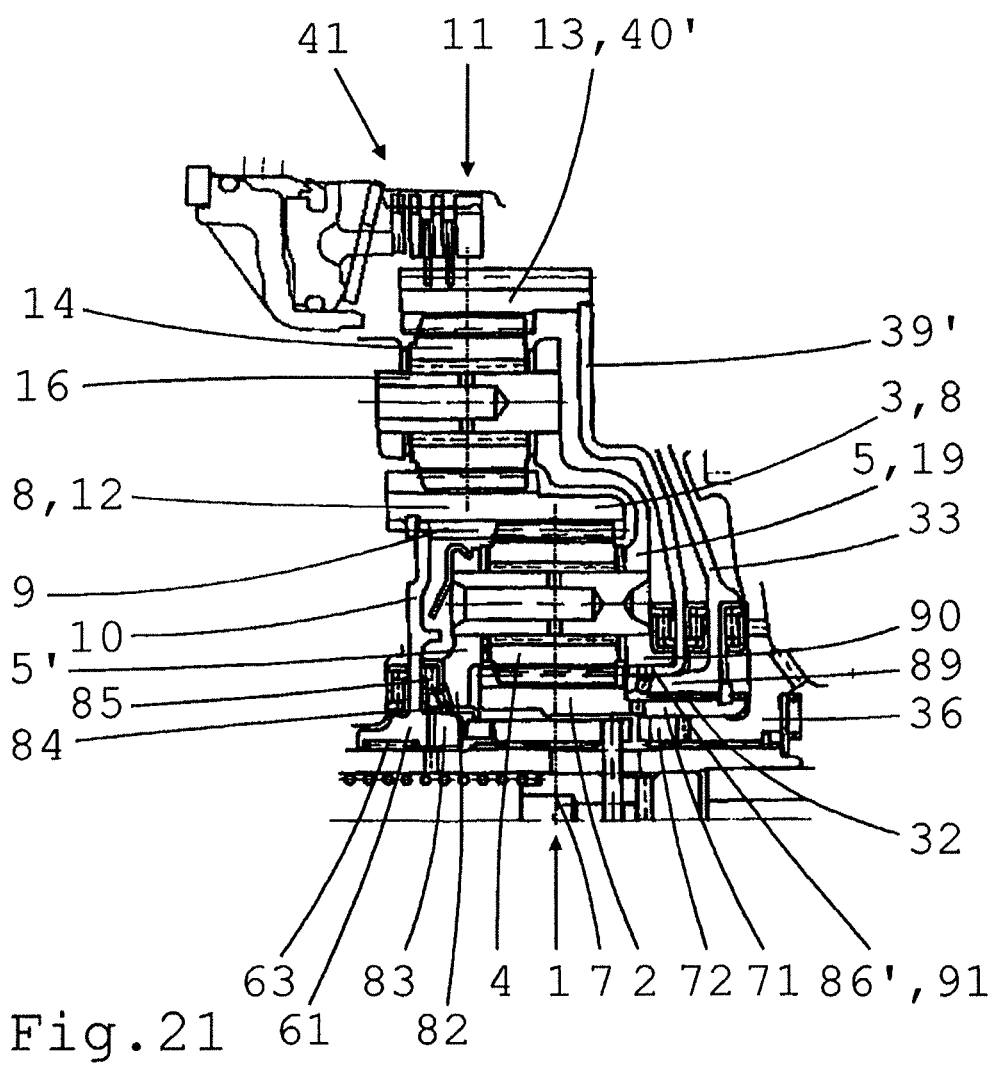

In a further bearing arrangement according to FIG. 21, the common carrier 19 is radially supported, axially on both sides, in order to avoid tumbling movements, in that the support of the common carrier 19, according to FIG. 20, is combined with the support of the carrier-side part of the inner carrier 5' according to FIG. 11. In this embodiment, the outer ring gear 13 is welded to the ring gear carrier 39' and connected in one-piece to the inner disk carrier 40' of the brake 41.

For all described multiple bearings of components, the respective radial support, except for the base support, can generally be implemented with radial play if the objective is avoiding forced movement; or they can all be implemented essentially free of radial play if avoiding imbalances is more important.

REFERENCE CHARACTERS 1 radially inner planetary gear set
2 inner sun gear
3 inner ring gear
4 planet gear
5 inner carrier, planet carrier
5' inner carrier, planet carrier
6 planet bolt
7 radial plane
8 common gear component (combined ring gear/sun gear)
9 synchronized gearing
10 carrier
10' carrier
11 radially outer planetary gear set
12 outer sun gear
13 outer ring gear
14 planet gear
15 outer carrier, planet carrier
15' outer carrier, planet carrier
16 planet bolts
17 radial plane
18 synchronization gearing
19 common carrier
20 input shaft
21 clutch
22 clutch hub
22' clutch hub
23 clutch sleeve
23' clutch sleeve
24 slot hole
25 driver
26 central bore hole
27 clutch piston
28 return spring
29 clutch
30 brake
31 transmission housing
32 spline, synchronization gearing
33 common carrier
34 outer disk carrier
35 inner disk carrier
36 inner disk carrier
37 synchronization gearing
38 synchronization gearing
39 ring gear carrier
39' ring gear carrier
40 inner disk carrier
40' inner disk carrier
41 brake
42 first planetary gear set
43 sun gear
44 ring gear
45 planet gear
46 carrier, planet carrier
47 planet bolts
48 synchronization gearing
49 carrier
49' ring gear carrier
52 second planetary gear set
53 sun gear
54 ring gear
55 planet gear
56 carrier, planet carrier
57 planet bolts
58 synchronization gearing
59 ring gear carrier
61 bearing hub of 10
61' bearing hub of 10, 10'
62 plain bearing bushing
62' plain bearing bushing
63 needle bearing
64 bearing hub of 49
64' bearing hub of 49
65 bearing hub of 49
66 plain bearing bushing
67 bearing shaft of 10
68 bearing shaft of 46
69 synchronization gearing
70 hollow shaft
71 bearing hub of 2
72 bearing shaft of 36
73 bearing hub of 39
74 bearing shaft of 2
74' bearing shaft of 2
75 startup web
76 bearing hub of 19
77 plain bearing bushing
78 bearing shaft of 8
79 bearing hub of 39
80 plain bearing bushing
81 bearing shaft of 19
82 bearing hub of 5'
82' bearing hub of 5'
83 bearing shaft of 10
83' bearing shaft of 10
84 angle disk
85 axial bearing
86 bearing hub of 39
86' bearing hub of 39
87 bearing sleeve
88 spline
89 bearing shaft of 33
90 bearing hub of 19
91 bearing shaft of 33

The invention claimed is:
1. A gear set arrangement of a planetary transmission for a motor vehicle, the gear set arrangement comprising:
at least first and second simple planetary gear sets (1, 11),
each of the first and the second planetary gear sets (1, 11) comprising a sun gear (2, 12), a ring gear (3, 13) and a carrier (5, 15) that supports a plurality of planetary gears (4, 14),
the first and the second planetary gear sets (1, 11) being disposed in a coaxial nested arrangement with the first planetary gear set (1) being arranged radially within the sun gear (12) of the second planetary gear set (11) in either a common radial plane, or in radial planes (7, 17) which are slightly offset axially from each other, the ring gear (3) of the radially inner first planetary gear set (1) and the sun gear (12) of the radially outer second planetary gear set (11), and the carriers (5, 15) of the first and the second planetary gear sets (1, 11) being each coupled together in a rotationally fixed manner, and only one of the sun gear (2, 12), the ring gear (3, 13) and the carrier (5, 15) of each of the first and the second planetary gear sets (1, 11) being either radially supported essentially free of radial play, on a disposed central transmission shaft (20), or being radially supported with respect to a centered supported component.

2. The gear set arrangement according to claim 1, wherein the inner ring gear (3) of the inner first planetary gear set (1) and the outer sun gear (12) of the outer second planetary gear set (11) are rigidly connected together by a common gear component (8) and are coupled, in a rotationally fixed manner substantially free of radial play, to a radial bearing (10, 10') that is radially supported in an assigned bearing hub (61, 61') on either the central transmission shaft (20) or a bearing shaft of a centrally supported component of one of the inner and the outer planetary gear sets (1, 11) or an axially adjacent assembly.

3. The gear set arrangement according to claim 2, wherein the common gear component (8) is coupled to the radial bearing (10) by a synchronization gearing (9) that is substantially free of a radial play.

4. The gear set arrangement according to claim 2, wherein the common gear component (8) is coupled to the radial bearing (10') by a welded connection.

5. The gear set arrangement according to claim 2, wherein the inner carrier (5) of the inner first planetary gear set (1) and the outer carrier (15) of the outer second planetary gear set (11) are rigidly connected together as a common carrier (19) with an assigned bearing hub (76) is radially supported on a bearing shaft (78) of the common gear component (8), that is supported centered via the radial bearing (10, 10').

6. The gear set arrangement according to claim 5, wherein a ring gear carrier (39) is radially supported, radially adjacent to the radial support of the common carrier (19) of the assigned bearing hub (79) on the bearing shaft (81) of the common carrier (19).

7. The gear set arrangement according to claim 6, wherein a synchronization gearing (38) is implemented with radial play, between the outer ring gear (13) and the ring gear carrier (39) for avoiding forced movement.

8. The gear set arrangement according to claim 5, wherein a ring gear carrier (39) comprises aluminum and has, on a radial interior, a bearing hub (73) which is supported directly on a bearing shaft (74) of the inner sun gear (2), which comprises steel.

9. The gear set arrangement according to claim 5, wherein a synchronization gearing (9) is implemented, with radial play, between the common gear component (8) and the radial bearing (10) for avoiding forced movement thereof.

10. The gear set arrangement according to claim 2, wherein a common carrier (5', 19) is radially supported in an assigned bearing hub (82, 82') on a bearing shaft (83, 83') of the radial bearing (10).

11. The gear set arrangement according to claim 10, wherein the common carrier (5', 19) comprises aluminum and is radially supported in a radially interior bearing hub (82) directly on a steel angle disk (84) that is supported on a bearing shaft (83) of the radial bearing (10) and of an axial bearing (85) disposed between the common carrier (5') and the bearing (10).

12. The gear set arrangement according to claim 10, wherein the common carrier (5', 19) comprises aluminum and is radially supported in a radial interior bearing hub (82') directly on a bearing shaft (83') of the radial bearing (10).

13. The gear set arrangement according to claim 1, wherein the inner ring gear (3) of the inner first planetary gear set (1) and the outer sun gear (12) of the outer second planetary gear set (11) are combined in a one-piece implementation as a common gear component (8).

14. The gear set arrangement according to claim 1, wherein the inner carrier (5) of the inner first planetary gear set (1) and the outer carrier (15) of the outer second planetary gear set (11) are rigidly connected together as a common carrier (19), and the common carrier (19) is radially supported by an assigned bearing hub (64, 64', 65) on one of the central transmission shaft (20), a bearing shaft (67, 68) of a centrally supported component (10, 46) of one of the first and the second planetary gear sets (1, 11) and an axially adjacent assembly (42).

15. The gear set arrangement according to claim 14, wherein the common carrier (19) is radially supported on a bearing shaft (67) of a radial bearing (10) that is coupled, in a rotationally fixed manner, to the inner ring gear (3) and to the outer sun gear (12).

16. The gear set arrangement according to claim 14, wherein the common carrier (19) is radially supported on the bearing shaft (68) of a carrier (46) of a further axially adjacent planetary gear set (42).

17. The gear set arrangement according to claim 14, wherein a ring gear carrier (39) is radially supported by an assigned bearing hub (79) on a bearing shaft (81) of the common carrier (19).

18. The gear set arrangement according to claim 1, wherein the inner sun gear (2) is radially supported either on the central transmission shaft (20) or a bearing shaft (72) of an axially adjacent assembly (29), and the outer ring gear (13) is coupled, in a rotationally fixed manner, by a synchronization gearing (38) to a ring gear carrier (39) that is radially supported by a radially internal bearing hub (73) on either the central transmission shaft (20) or a bearing shaft (74) of a centrally supported component (2) of one of the first and the second planetary gear sets (1) or the axially adjacent assembly.

19. The gear set arrangement according to claim 18, wherein the inner sun gear (2) comprises steel and is radially supported directly on either an aluminum bearing sleeve or a component (36) of the axially adjacent assembly (29) which comprises aluminum, and the bearing sleeve or the component (36) is disposed on the central transmission shaft (20) in a rotationally fixed manner and essentially free of radial play.

20. The gear set arrangement according to claim 18, wherein the ring gear carrier (39) comprises aluminum and is radially supported, by an assigned bearing hub (73), directly on a bearing shaft (74) of the inner sun gear (2).

* * * * *